Sept. 23, 1952 J. R. CAMBRON ET AL 2,611,619

PHONOGRAPH

Filed May 15, 1948 13 Sheets-Sheet 1

INVENTORS:
John R. Cambron
David C. Rockola
By Sheridan, Davis & Cargill
Attorneys

PHONOGRAPH

INVENTORS:
John R. Cambron
David C. Rockola
By Sheridan, Davis & Cargill
Attorneys INVENTORS:
John R. Cambron
David C. Rockola
By Sheridan, Davis & Cargill
Attorneys Sept. 23, 1952 J. R. CAMBRON ET AL 2,611,619

PHONOGRAPH

Filed May 15, 1948 13 Sheets-Sheet 4

INVENTORS:
John R. Cambron
David C. Rockola
By Sheridan, Davis & Cargill
Attorneys Sept. 23, 1952 J. R. CAMBRON ET AL 2,611,619

PHONOGRAPH

Filed May 15, 1948 13 Sheets-Sheet 5

INVENTORS:
John R. Cambron
David C. Rockola
By Sheridan, Davis & Cargill
Attorneys Sept. 23, 1952 J. R. CAMBRON ET AL 2,611,619

PHONOGRAPH

Filed May 15, 1948 13 Sheets-Sheet 6

INVENTORS:
John R. Cambron
David C. Rockola
By Sheridan, Davis & Cargill
Attorneys Sept. 23, 1952 J. R. CAMBRON ET AL 2,611,619

PHONOGRAPH

Filed May 15, 1948 13 Sheets-Sheet 7

INVENTORS:
John R. Cambron
David C. Rockola
By Sheridan, Davis & Cargill
Attorneys INVENTORS:
John R. Cambron
David C. Rockola
By Sheridan, Davis & Cargill
Attorneys Sept. 23, 1952 J. R. CAMBRON ET AL 2,611,619

PHONOGRAPH

Filed May 15, 1948 13 Sheets-Sheet 9

INVENTORS:
John R. Cambron
David C. Rockola
By Sheridan, Davis & Cargill
Attorneys INVENTORS:
John R. Cambron
David C. Rockola
By Sheridan, Davis & Cargill
Attorneys Fig. 20 Fig. 21
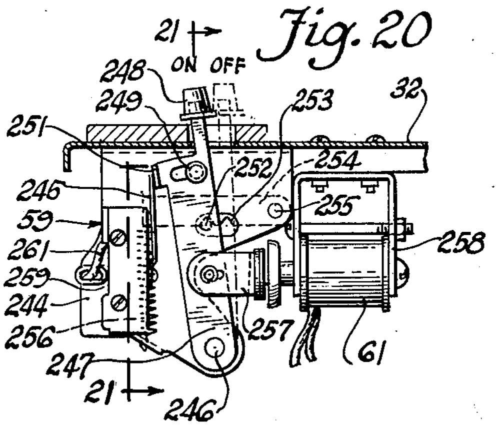
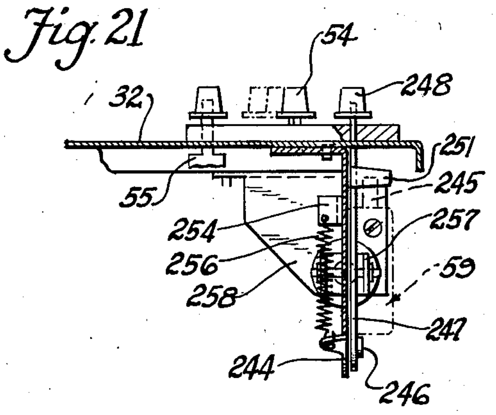
Fig. 22
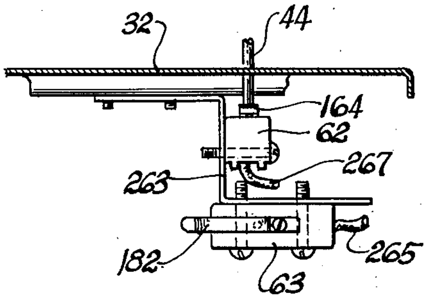
Fig. 23
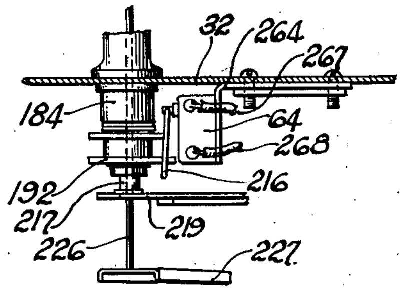
Fig. 24
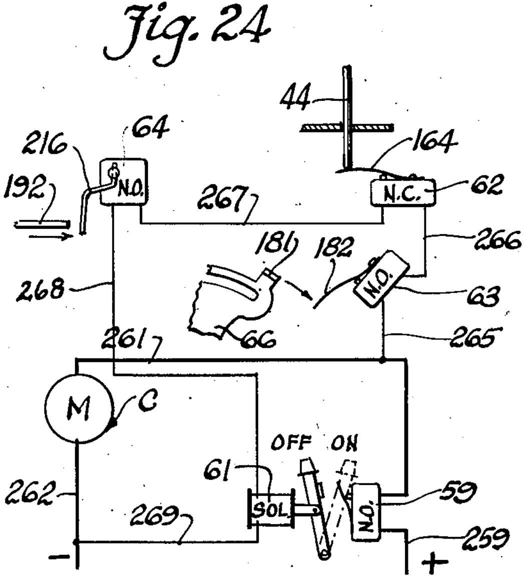
INVENTORS:
John R. Cambron
David C. Rockola
By Sheridan, Davis & Cargill
Attorneys INVENTORS:
John R. Cambron
David C. Rockola
By Sheridan, Davis & Cargill
Attorneys INVENTORS:
John R. Cambron
David C. Rockola
BY Sheridan, Davis & Cargill
Attorneys Patented Sept. 23, 1952

2,611,619

UNITED STATES PATENT OFFICE 2,611,619

PHONOGRAPH

John R. Cambron and David C. Rockola, Chicago, Ill., assignors to Rock-Ola Manufacturing Corporation, Chicago, Ill., a corporation of Illinois Application May 15, 1948, Serial No. 27,297

2 Claims. (Cl. 274—10)

This invention relates in general to phonographs, and more particularly to the home type of automatic record changer adapted to play either one or a plurality of disc records.

A principal object of the invention is the provision of such a phonograph which is capable of playing successively and automatically either the recordings on both sides of a plurality of disc records, or the recordings on only one side of each of said records, or which may be employed in the so-called manual style of operation for playing either recording on any particular record.

Another important object of the invention is to provide novel mechanism in such a phonograph which enables either ten-inch or twelve-inch disc records to be played during either the automatic or the manual operation thereof.

A further important object is the provision of novel control means in such a phonograph, including a normally closed control switch opened by the weight of one or more records in a record storage means and automatically closed whenever the last of such records is removed therefrom, and a normally open play-terminating switch which is closed by the record reproducer means or tone arm upon completion of its playing movement, whereby a main switch, manually closable to initiate machine operation, is automatically opened by a solenoid which is energized when all of these switches are closed.

Another object of the invention is to prevent termination of the machine operation until after playing of both sides of the last record to be played, when the phonograph is set to play the recordings on each side of one or more records, which is accomplished by providing a normally open fourth switch, connected in series with the other switches above-enumerated, which is closed only upon actuation of auxiliary record supporting means to their normal inoperative position, whereby machine operation will not be terminated upon completion of the playing of a recording on the under side of the last record by closing of the play-terminating switch by the tone arm, because such auxiliary record supporting means will then be in their operative position supporting such played record and this fourth switch will be open.

A further important object of the invention is the provision, in a record changing phonograph having a turntable, a motor for rotating the same and actuating mechanism adapted to be cyclically operated thereby and stopped automatically upon engagement of the tone arm with a recording to be played, of novel trip mechanism for automatically re-instituting operation of the actuating mechanism in response to movement of the tone arm to play-terminating position upon completion of the playing of such recording.

Another object is to provide novel reject mechanism in such a phonograph comprising means manually operable to terminate the playing of a recording at any time during the playing thereof and immediately to institute operation of the next cycle of operations of the actuating mechanism.

A further object of the invention is the provision of a record changing phonograph having a turntable, record reproducer means, record storage means for storing a plurality of disc records, means for moving the records one at a time from the storage means into a position in alignment with the turntable, auxiliary record supporting means for receiving each record so positioned by the moving means and supporting it for playing of the recording on the reverse side thereof by the reproducer means and for thereafter delivering such record to the turntable for playing of the recording on the obverse side thereof by the reproducer means, and cyclically operable actuating mechanism for automatically actuating the moving means, supporting means and reproducer means in proper sequence to accomplish such successive playing of the recordings on both sides of each record in the storage means.

Another object of the invention is to provide selectively operable control mechanism for varying the cyclic operation of the actuating mechanism in such a phonograph so as to eliminate the playing of the recordings on the reverse sides of the records by causing the auxiliary supporting means to deliver each record, immediately as received from the moving means, directly to the turntable, whereby only the recordings on the obverse sides of the records in the storage means will be played successively.

A further object is to provide novel yieldable connections between the actuating mechanism of such a phonograph and the auxiliary record supporting means, so as to prevent any damage to the parts, which otherwise would result from manual forcing movement of the supporting means out of any position to which the same has been moved by the actuating mechanism, by permitting such manual movement of the supporting means; these yieldable connections also functioning to return the supporting means to such position upon manual release thereof.

Another object of the invention is the provision of novel connections between the reproducer means or tone arm of such a phonograph and the actuating mechanism which enable the latter automatically to move the tone arm from play-terminating position to an inoperative position and to play-initiating position in engagement with either the reverse or obverse side of either a ten or twelve-inch record, and which also permit such movements of the tone arm manually without causing any damage thereto and without removing the tone arm from subsequent automatic control and actuation by the actuating mechanism.

A further object is to provide novel mechanism for automatically imparting horizontal swinging movements to a tone arm from play-terminating to an inoperative position and to initial playing position, which permits uninterrupted manual swinging of the tone arm to such inoperative position at any time, thus eliminating any possibility of injury to a person resulting from accidental automatic return of the tone arm from inoperative to initial playing position during an attempted manual swinging thereof.

Another object of the invention is to provide, in a phonograph having a tone arm for playing the recordings on both sides of a disc record, means for automatically moving the stylus end of the tone arm upwardly into engagement with the lower side of a record, which are separate from means for moving the stylus end of the tone arm downwardly into engagement with the upper side of a record, so that proper record-engaging stylus pressure may be maintained accurately under all playing conditions.

Numerous other objects and advantages of the invention will be apparent as it is better understood from the following description, which, when taken in connection with the accompanying drawings, discloses a preferred embodiment thereof.

In the drawings:

Fig. 20 is a detail elevational view of the main operating switch mechanism, as seen from the front of the machine;

Fig. 21 is a detail vertical sectional view taken substantially on line 21—21 of Fig. 20;

Fig. 22 is a detail elevation of two of the control switches;

Fig. 23 is a detail elevational view showing the play-terminating control switch;

Fig. 24 is a diagrammatic view of the electrical circuit of the machine;

*General*

Figure 7:
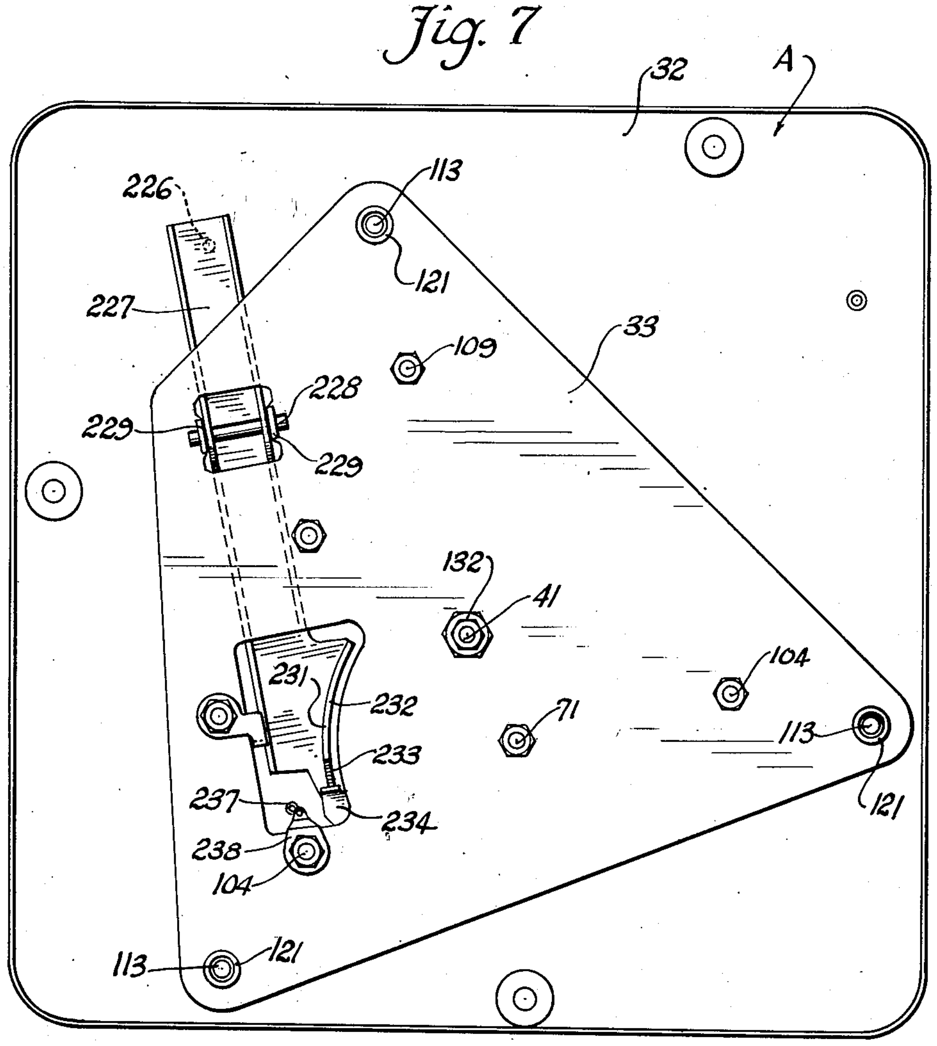
Fig. 7 is a bottom plan view of the mechanism of Fig. 1, with parts thereof omitted.

Referring more particularly to the drawings, a brief description first will be given of the general function and operation of the phonograph mechanism illustrated therein as an embodiment of the present invention, before describing the parts thereof in detail. The illustrated record changer is shown as being mounted upon a supporting frame A comprising a top plate 32 and a bottom plate 33 (Fig. 7). Rotatably mounted upon this supporting frame is a conventional turntable B (Fig. 12) having a depending peripheral flange 34 in driven engagement with a friction wheel 35 (Figs. 1 and 8) which, in turn, is driven in well known manner by a suitable electric motor C. Record reproducer means D (Figs. 1 to 3, 10 and 11) is provided which comprises a single tone arm 36 having mounted in well known manner in the forward end thereof a crystal type pick-up cartridge 37 (Fig. 10) and upwardly and downwardly extending needles 38 and 39, respectively. It will be understood that each needle or stylus 38, 39 is operatively connected in the usual manner to the crystal so as to transmit thereto physical variations in the recorded sound track or groove of a record for transportation thereby into electrical impulses adapted to be amplified and converted into sound by suitable amplifier and speaker means, not shown in the drawings.

Figure 28:
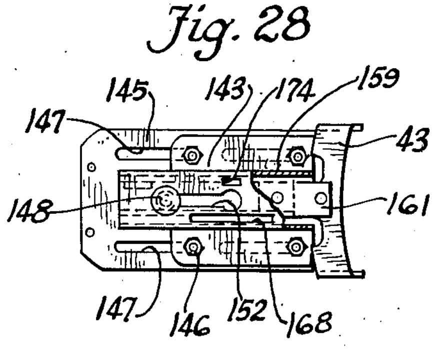
Fig. 28 is a bottom plan view of the record moving or push-off mechanism slide.
Figure 29:
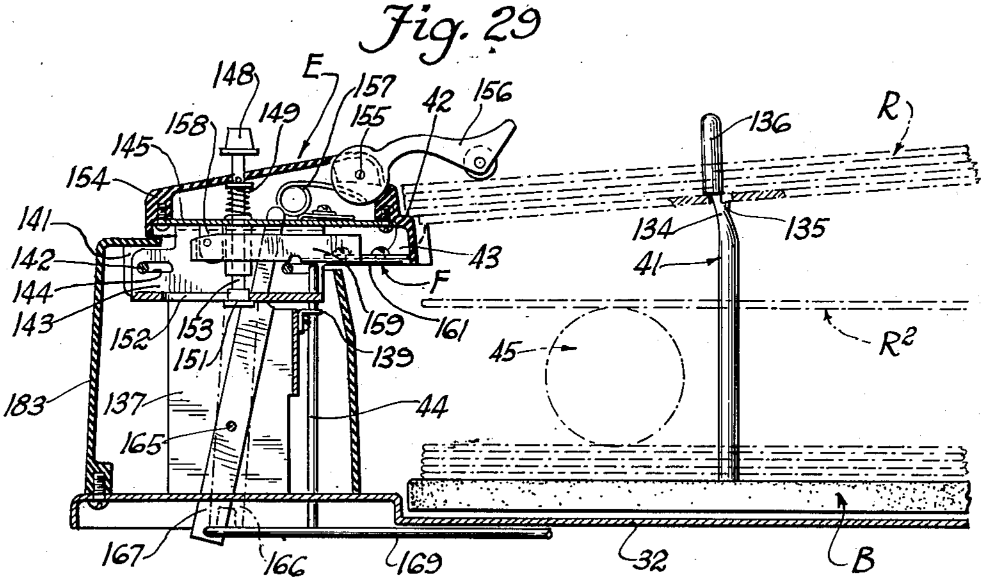
Fig. 29 is a view similar to Fig. 25 showing the record storage means in position to receive 10 inch records and the record moving or push-off mechanism in operated position.

Record storage means E are provided (Figs. 1 and 25 to 31) which include an off-set spindle 41 and a slidably adjustable shelf 42 for peripherally supporting one or more records R in stack position in spaced relationship to the turntable B, as shown in broken lines in the upper part of Fig. 29. Record moving means F (Figs. 1 and 25 to 30) are operatively associated with the record storage means E and include a push-off slide 43 for transversely moving the lowermost record in the supported stack to align the usual center hole therein with the lower vertical portion of the off-set spindle 41 to permit such record to fall by gravity from the stack. The record moving means F also includes a switch actuating control member or vertical rod 44 operable to control the automatic stopping of the phonograph in a manner to be described hereafter.

Auxiliary record support means G (Figs. 1, 9, 10, 15 to 19 and 29), including vertically movable and horizontally swingable wheels 45, are provided for receiving each record separated from the stack by the moving means F for supporting and rotating such record for the playing of the recording on the underside thereof by the reproducer means D, and for thereafter delivering such record to the turntable B for the playing of the recording on the upper side thereof by the reproducer means D. The present invention contemplates not only automatic cyclic operation of these mechanisms to accomplish such successive playing of the recordings on both sides of a plurality of records, but also contemplates the optional playing serially of the recordings on the upper sides only of a plurality of records by altering the cycle of operation of the auxiliary record support means G, so that the wheels 45 function only to receive a record delivered by the moving means F and to deliver the same to the turntable B for the playing of the upper recording thereon by the reproducer means D.

For accomplishing these functions automatically, cyclically operable actuating mechanism H is provided (Figs. 2, 5, 8, 9 and 12) which includes a horizontally disposed cam gear 46 having a railroad type switch 47 pivotally mounted on the under surface thereof for rendering operative outer and inner cam grooves 48 and 49, respectively, during successive complete rotations of the cam 46. Cam 46 is adapted to be driven by a pinion 51 rigidly secured to the lower end of the hub of the turntable B. The gear formed on the periphery of the cam 46 has a short gap therein (Figs. 2 and 8) which limits actuation of the cam gear by pinion 51 to one complete rotation each time that the cam gear is brought into engagement with this driving pinion. The means for causing driving engagement between the cam gear 46 and pinion 51 comprises a spline 52 secured to, or formed integrally with, the hub of the turntable B above the pinion 51 and adapted to be engaged by the outer end of a trip lever 53 pivotally mounted on the upper side of cam gear 46. Movement of the trip 53 from its normally inoperative full line position of Fig. 5 to swing the outer end thereof outwardly to its lower broken line position therein, will cause this outer end of the trip lever to be engaged by the spline 52, which is rotating with the turntable B, which will rotate cam 46 a sufficient distance to engage the peripheral gear thereon with driving pinion 51. The cyclically operable actuating mechanism H also includes driving connections between cam gear 46 and the auxiliary record supporting wheels 45 (Figs. 8, 9, and 15 to 19) for simultaneously swinging such wheels horizontally and for simultaneously raising and lowering them; between cam gear 46 and the tone arm 36 (Figs. 2 to 5, 8 and 10 to 12) for swinging the latter horizontally; from cam gear 46 for raising the stylus end of the tone arm 36 from neutral position to engage needle 38 with the lower surface of a record supported on wheels 45 (Figs. 7 to 10 and 14); from cam gear 46 for lowering the stylus end of the tone arm from neutral position to engage needle 39 with the upper surface of a record on turntable B (Figs. 2, 8 and 11 to 13); and driving connections from cam gear 46 to the push-off mechanism slide 43 (Figs. 8, 9 and 25 to 30).

Novel control means are also provided in the instant phonograph which include a control lever 54 (Figs. 1, 2, 5, 6 and 8) selectively settable to predetermine automatic operation of the phonograph, either to play successively the recordings on both sides of one or more records, or to play successively the recordings on similar sides only of a plurality of records, or to prevent operation of the actuating mechanism H to permit manual operation of the machine. A reject lever 55 (Figs. 1, 2, 5, 6 and 8) is also provided which is selectively operable at any time during the playing of a record to terminate such playing and automatically initiate operation of the normally next succeeding cycle of the actuating mechanism. To accomplish this result, reject lever 55 moves a latch lever 56 (Figs. 5, 6 and 12) from its full line position of Fig. 5, wherein it normally maintains trip lever 53 in its full line inoperative position, to its broken line position to permit movement of trip lever 53 to its operative position by a suitable spring 57. This latch lever 56 is similarly actuated to initiate rotation of cam gear 46 by the inward horizontal swinging of tone arm 36 to its play-terminating position, illustrated in broken lines at 36*d* in Figs. 1 and 3, upon completion of the playing of any recording, in a manner to be described more in detail hereinafter. The control means also includes a linkage settable by the selective setting of the peripheral supporting shelf 42 to determine the particular initial playing position to which the tone arm 36 will be moved automatically, in accordance with whether a twelve inch or a ten inch record is being played, as illustrated in broken lines at 36b and 36c, respectively (Figs. 2, 3, 8, 25, 27 and 29).

A suitable electric circuit for controlling operation of the motor C is illustrated diagrammatically in Fig. 24, and includes a source of electrical energy 58, a main switch 59 (Figs. 1, 2, 8, 20 and 21) which is normally open and is adapted to be closed manually, and a solenoid 61 (Figs. 2, 8 and 20) adapted, when energized, to open the main switch automatically. The control circuit also includes three switches connected in series with the main switch 59 and the solenoid 61, whereby the solenoid 61 will be energized to open the main switch 59 when, and only when, all three of these switches and the main switch are closed. The first of these control switches comprises a record-responsive switch 62 (Figs. 22 and 31) which is normally closed and is adapted to be opened by the weight of a record or records R on the storage means E through the agency of rod 44. Another of these control switches comprises an auxiliary record support actuated switch 63 (Figs. 2, 8, 9, and 22) which is normally open and is closed only when the auxiliary record supporting wheels 45 are swung out to their normal inoperative position, as shown in dotted lines in Figs. 1, 15 and 18. The remaining one of these control switches comprises a tone arm actuated, play-terminating switch 64 (Figs. 8 and 23) which is normally open and is adapted to be closed by the swinging of tone arm 36 to its innermost or play-terminating position, immediately after tripping of latch lever 56 by the tone arm.

*General operation*

Figure 1:
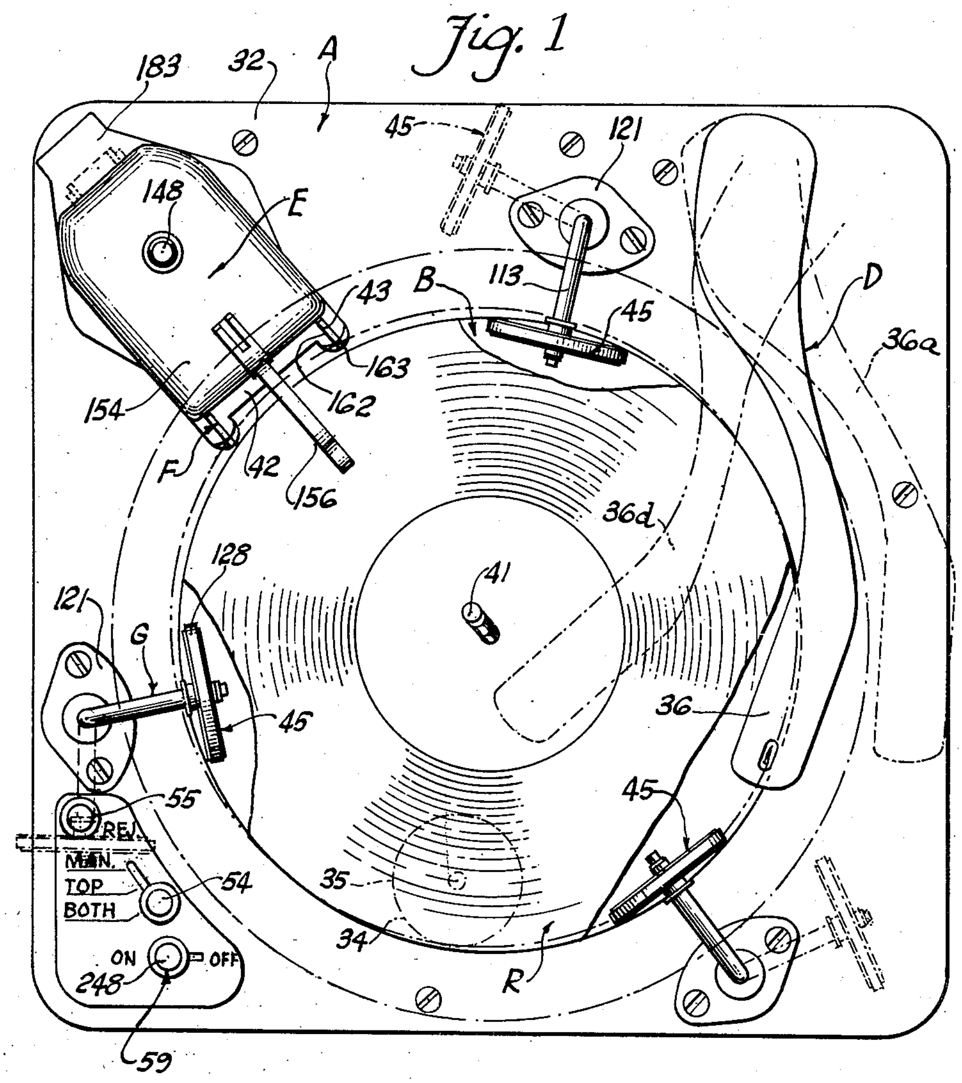
Figure 1 is a top plan view of a phonograph embodying the features of the instant invention and showing the auxiliary record supporting and delivering wheels in full lines in their operative positions for supporting a record for playing of the recording on the under or reverse side thereof, with the tone arm shown in full lines in play-initiating position in relation to such record.
Figure 15:
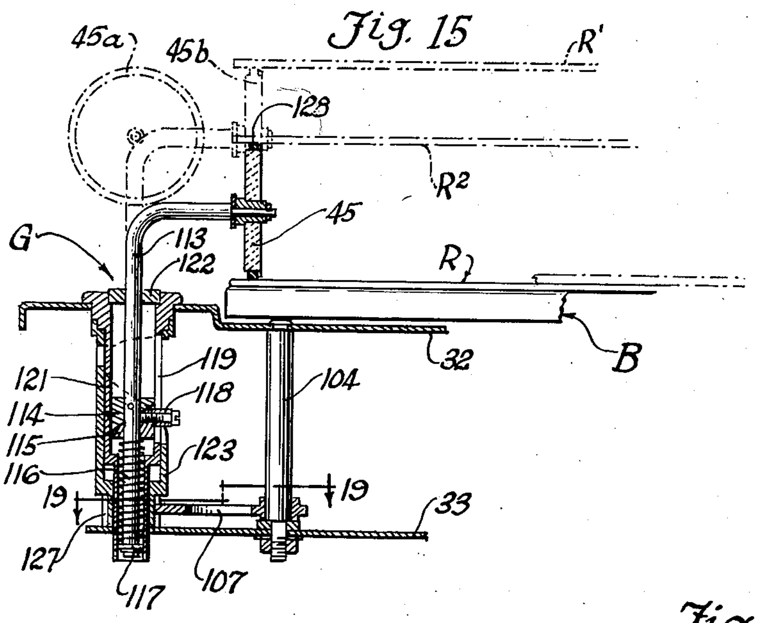
Fig. 15 is a vertical section through the center line of the supporting and actuating mechanism of one of the auxiliary record supporting wheels when in its full line position of Fig. 1.
Figure 16:
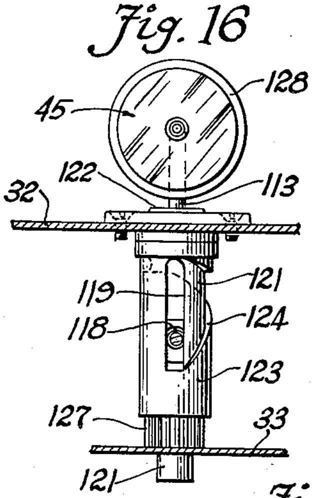
Fig. 16 is an elevational view of the auxiliary record supporting wheel mechanism of Fig. 15, as seen from the right in the latter figure.
Figure 17:
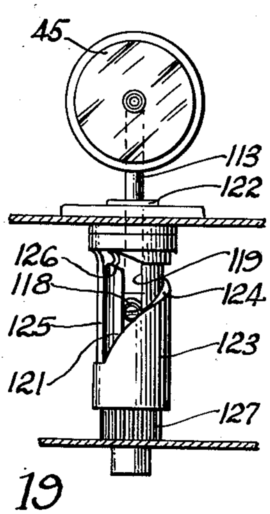
Fig. 17 is a view similar to Fig. 16 showing the wheel in a partially raised position.
Figure 18:
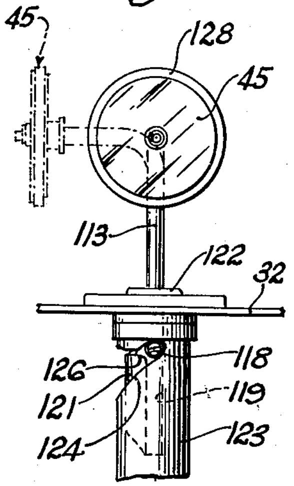
Fig. 18 is similar to Figs. 16 and 17 showing the wheel in full lines in its uppermost, inner position, and in broken lines in its normal outer, inoperative position.

In normal inoperative condition, the auxiliary record supporting means G assumes a position in which the wheels 45 are in their uppermost and outwardly disposed broken line positions of Figs. 1, 15 and 18. The record storage means E is adapted to be disposed by horizontal movement either in its innermost position of Figs. 1 and 29 for supporting a stack of ten inch records, or in its outermost position of Fig. 25 for supporting a stack of twelve inch records. If it is desired to play successively the recordings on the under and upper sides of each of the records R mounted in stack upon the storage means E, control lever 54 is moved to its full line position of Figs. 1, 2, 5 and 8. If it is desired to play automatically and successively only the recordings on the upper sides of the records, however, this control lever 54 is moved to its intermediate broken line position of Fig. 5, as designated in Fig. 1 as the "Top" position, and if it is desired to operate the phonograph manually, the outer end of this control lever 54 is moved further in the same direction, or rearwardly, to the extreme position designated in Fig. 1 as "Man." The only other necessary action on the part of the operator, after he has placed the records desired to be played on the storage means E, if the machine is to be operated automatically, is to manually close the main switch 59.

Figure 5:
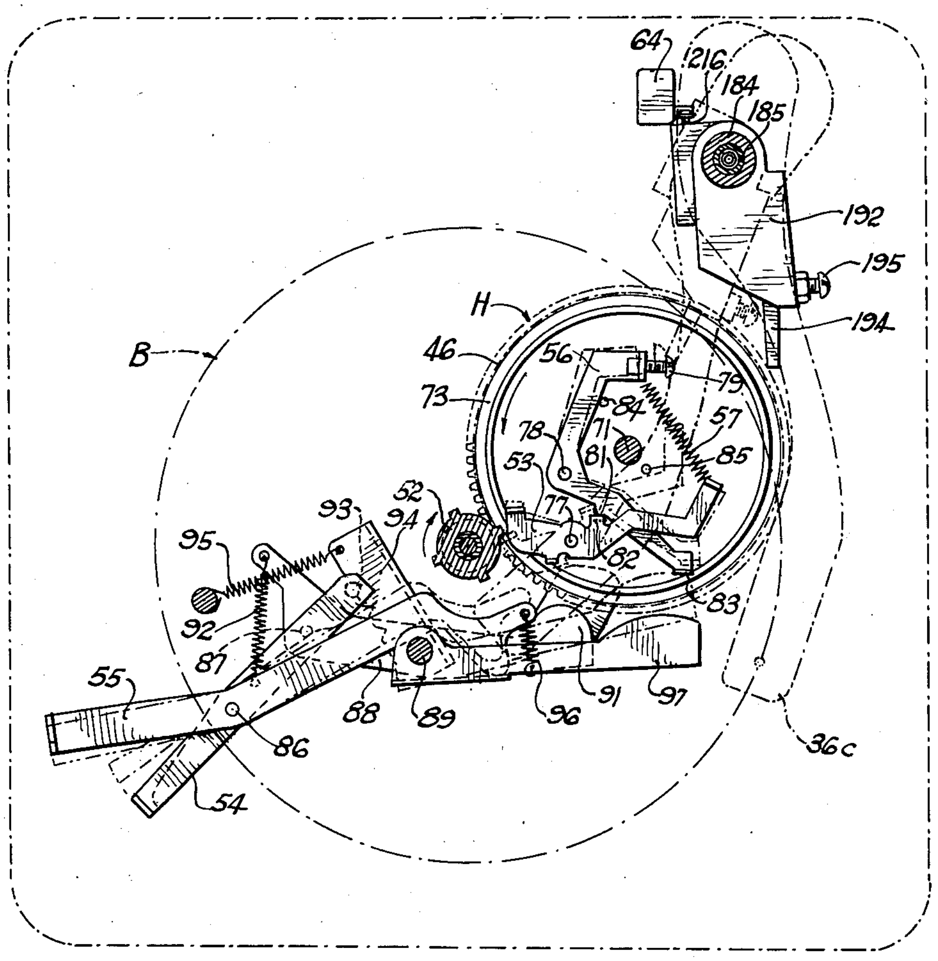
Fig. 5 is a view similar to Fig. 2 showing the details of the operation control and reject levers and the trip mechanism for initiating operation of the actuating mechanism.

The latch lever 56 is normally in its inoperative broken line position of Fig. 5 following automatic termination of a previous operation of the machine, so that, with the control lever 54 in either of its two selectively settable positions for determining automatic operation, such closing of the main switch 59 will initiate rotation of cam gear 46 through the agency of spline 52 and trip lever 53. If control lever 54 has been moved to its manual position, however, the trip lever 53 will be held thereby in its rearmost inoperative position, as shown in broken lines in Fig. 5 and in full lines in Fig. 6, in a manner to be described in detail hereafter, to prevent actuation of cam gear 46.

The first resulting complete rotation of cam gear 46, when control lever 54 is set to cause successive playing of both sides of the records, swings the wheels 45 horizontally to their operative full line position of Fig. 1, swings the tone arm 36 to its outermost inoperative position, as designated at 36a in Fig. 1, actuates the record moving means F to displace the lowermost record in the stack from stack position into vertical alignment with the turntable B, whereupon such displaced record falls upon the wheels 45, lowers the wheels 45 simultaneously until they engage the upper surface of the turntable B, to cause the wheels to be rotated to rotate the record supported thereon in a direction opposite the direction of rotation of the turntable, and swings the tone arm inwardly horizontally to its initial playing position, as illustrated in full lines in Fig. 1, and raises the stylus end thereof to engage the needle 38 with the underside of the record. At this point, cam gear 46 comes to rest in the position shown in Fig. 9, the gap in the peripheral teeth thereon again having been brought into registry with the pinion 51, and the trip lever 53 having been reset to its full line inoperative position of Fig. 5 during such rotation of the cam gear, in a manner to be described hereinafter in detail. Prior to initiation of rotation of cam gear 46, as above described, track switch 47 was in its normal broken line position of Fig. 9, and during this first rotation of the cam gear, a pin 65 on the end of a lever 66 (comprising part of the connections between the cam gear and the auxiliary record support means G) which was initially in its broken line position of Fig. 9 in the outer track 48 of the cam gear, has been moved into the inner track 49 by such rotation of the cam gear. As this pin 65 passes the trailing edge of track switch 47, it moves the latter to its full line position of Fig. 9, so that during the subsequent rotation of cam gear 46, this pin 65 is caused to re-enter the outer track groove 48 and re-position the switch 47 to its broken line position of this figure.

Upon completion of the first rotation of cam gear 46, the actuating mechanism remains inactive throughout the ensuing playing of the recording on the under side of the record being supported and rotated by the wheels 45. Upon completion of the playing of this recording, the tone arm 36 functions to trip latch lever 56 from its full line to its broken line position of Fig. 5 to permit spring 57 to again engage trip lever 53 with spline 52, thus initiating a second rotation of cam gear 46. During this second rotation of the cam gear, the stylus end of the tone arm is moved downwardly to neutral position, the tone arm is swung from its play-terminating position 36d of Fig. 3 to its inoperative position 36a, the wheels 45 are moved upwardly simultaneously and then swung outwardly horizontally to their normal inoperative position, and the tone arm is swung inwardly to initial playing position 36b or 36c, and the needle end thereof lowered to engage needle 39 with the upper side of the record. It will be understood that this outward swinging of wheels 45 to their inoperative position results in that record, the recording on the under side of which has just been played, being dropped onto the turntable B. As soon as needle 39 is engaged with the playing groove in the upper surface of this record, cam gear 46 has completed its second rotation and come to a halt with the parts in their broken line positions of Fig. 9 and the trip lever 53 again reset to its inoperative full line position of Fig. 5. Consequently, upon completion of the playing of the recording on the obverse side of this record, tone arm 36 again functions to initiate operation of the actuating mechanism, which starts another complete cycle of operations comprising two successive rotations of cam gear 46. As the wheels 45 are swung outwardly to their inoperative position following playing of the recording on the under side of the last or uppermost record which has placed on the storage means E, control switch 63 is closed. Since control switch 62 also was closed upon removal of the last record from the storage means E by the record moving means F, subsequent closing of control switch 64 by movement of tone arm 36 to play-terminating position, following playing of the obverse recording on this last record, causes energization of solenoid 61 to automatically open main switch 59 to terminate operation of the phonograph.

Figure 9:
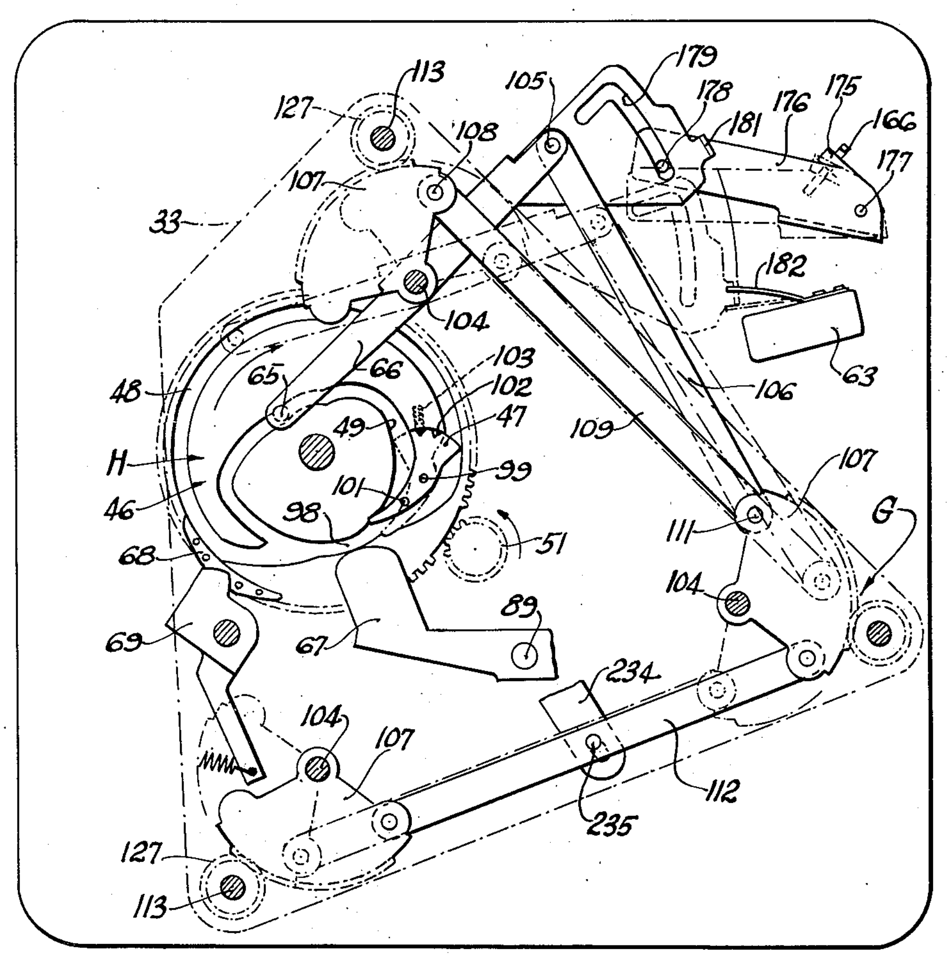
Fig. 9 is a view similar to Fig. 8, with some parts omitted, showing the mechanism for actuating the auxiliary record supporting wheels in full lines in the position in which the wheels have been moved thereby to their full line positions of Fig. 1.

If control lever 54 initially was set to its intermediate or "Top" position, the rear end 67 of a lever actuated thereby would have been moved to its inner position of Fig. 9. In such position, the inner end 67 of this lever functions to swing the track switch 47 from its broken line to its full line position of Fig. 9 during the initial portion of each cyclic rotation of cam gear 46. Consequently, only the outer track groove 48 is operative during successive rotations of cam gear 46, whenever control lever 54 is so set, so that each rotation of the cam gear causes delivery of the lowermost record in stack on the storage means E to the auxiliary supporting wheels 45 and by the latter to the turntable B for playing of the recordings on the obverse sides thereof. Setting of control lever 54 to its innermost or manual position causes the trip lever 53 to be moved to its full line position of Fig. 6 to prevent engagement thereof with the spline 52. The phonograph then may be operated manually to play the recording on the upper surface of any record placed on turntable B.

From the above description, it will now better be appreciated how the instant mechanism may be operated selectively to play automatically and successively the recordings on both sides of a plurality of disc records or only the recordings on a corresponding side of each of one or more records. In either type of automatic operation, the auxiliary record supporting wheels 45 function to receive the record removed from the record storage means E by the record moving means F and to prevent damage to either the tone arm and stylus or the record, which might otherwise obtain in the direct dropping of a record from the stack onto the turntable B. Since the record moving means F functions only when the auxiliary record supporting wheels 45 are in their inwardly swung, full line position of Fig. 1, even faulty operation of record moving means F resulting in the removal of more than one record from the stack will not affect playing operation of the machine nor cause any damage to the records or tone arm. These auxiliary record supporting wheels 45 also enable a smoother cycle of operation of the actuating mechanism by permitting slower return movement of the tone arm from its play-terminating position to its inoperative position. In prior art record changers, such return movement of the tone arm must be accomplished rapidly in a very small portion of the cycle of operations to insure the tone arm being moved beyond the periphery of the turntable before actuation of the push-off mechanism. In the instant machine, however, a record may be removed from the stack by the moving means F during return movement of the tone arm. In other words, a greater portion of the cycle of operations may be employed to accomplish return movement of the tone arm, since the auxiliary record supporting wheels 45 function as a means for protecting the tone arm during such return movement.

It will be understood that upon completion of the playing of any recording, whether it be on the upper or under side of a record, the tone arm 36 functions to close control switch 64 and to trip latch lever 56. However, if any record remains in the storage means E at this time, such closing of switch 64 is ineffective, since control switch 62 connected in series therewith will be open, this switch 62 only being closed when no records remain on the record storage means E. Also, even with this record-responsive control switch 62 closed, the closing of control switch 64 by the tone arm will be ineffective unless control switch 63, also connected in series therewith is closed, and the latter condition obtains only when the auxiliary record supporting wheels 45 are in their outermost inoperative position. The wheels 45 are so positioned only during the playing of the recording on the upper side of the record. Consequently, play-terminating closing of control switch 64 by tone arm 36 is effective to terminate operation of the machine only following the playing of the recording on the upper side of the last record.

Tone arm 36 is then free to be swung manually outwardly to its inoperative position so that the played records may be removed vertically from the turntable B. The same or other records may then be mounted on the record storage means E. In order that the operator may be required thereafter only to perform the single function of closing the main switch 59 to initiate another automatic cycle of operations, the play-terminating closing of control switch 64 by the tone arm 36 is so timed as to permit immediately subsequent tripping of latch lever 56 by the tone arm as the driving motor C comes to a stop. Consequently, trip lever 53 will be left in its unlatched, operative position upon termination of a complete cycle of operations following the playing of the recording on the upper side of the last record previously placed in the stack, so that re-energization of motor C by closing of main switch 59 to initiate another automatic cycle of operations will cause the trip lever to be engaged by the spline 52 to automatically initiate actuation of cam gear 46. In order to insure such operation, to prevent over-riding of cam gear 46 beyond its normal inoperative position, and to insure completion of each rotation thereof, a brake and cam gear positioning mechanism is provided (Figs. 8 and 9) which comprises a notched cam 68 secured to the under side of cam gear 46, and a spring-loaded positioning finger 69 cooperating therewith.

It will be apparent, of course, that control switch 64 may be closed at such time as to prevent subsequent tripping of latch lever 56 upon completion of the playing of the recording on the upper side of the last record, if desired. However, such timing of the closing of control switch 64 would result in the operator of the phonograph having to actuate reject lever 55 to trip latch lever 56 after closing of the main switch 59, in order to initiate a new automatic cycle of operations. The preferred timing of the closing of control switch 64 by tone arm 36 thus eliminates the necessity of the operator actuating reject lever 55 to start an automatic playing cycle.

The specific means for swinging the tone arm horizontally, as well as that for moving the stylus end thereof vertically, the novel tone arm actuated trip mechanism for automatically initiating operation of the actuating mechanism, and the specific connections between the actuating mechanism and the auxiliary record supporting wheels, also constitute novel improvements having distinct advantages over comparable mechanism in the prior art, but such advantages will be discussed in detail in conjunction with the following specific descriptions of these several mechanisms.

*Actuating and trip mechanism*

Figure 12:
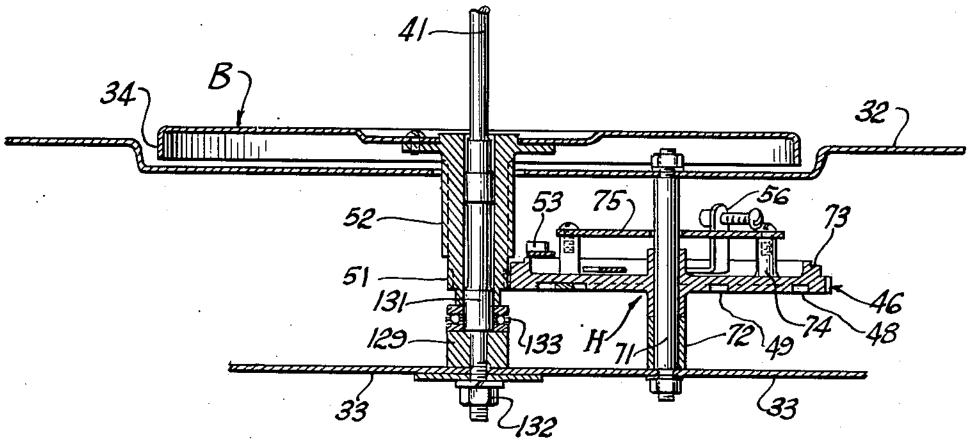
Fig. 12 is a detail vertical section through the center lines of the turntable spindle and the actuating mechanism cam gear.

As best seen in Fig. 12, the cam gear 46 of the actuating mechanism is mounted for rotation upon a vertical shaft 71 secured at its opposite ends to the top and bottom plates 32, 33 of the supporting frame A, the hub portion of the cam gear resting upon a suitable spacer sleeve 72 mounted on the lower portion of shaft 71. In addition to the peripheral gear teeth on the actuating cam 46, the latter is provided with an annular cam track 73 formed on the upper surface thereof for moving the tone arm 36 from its lower playing position upwardly to a neutral position, in a manner to be described in detail hereinafter. Cam gear 46 is also provided with a plurality of posts 74 formed integrally with, and upstanding from, the main body portion thereof. Mounted upon the upper ends of the posts 74 and secured thereto in any suitable manner is an eccentric edge cam disc 75 for controlling horizontal swinging movements of tone arm 36, in a manner later to be described in detail. This cam disc 75 is provided with a central aperture through which the cam gear supporting shaft 71 extends, and an aperture 76 (Fig. 4) through which the rear end of latch lever 56 extends.

Figure 6:
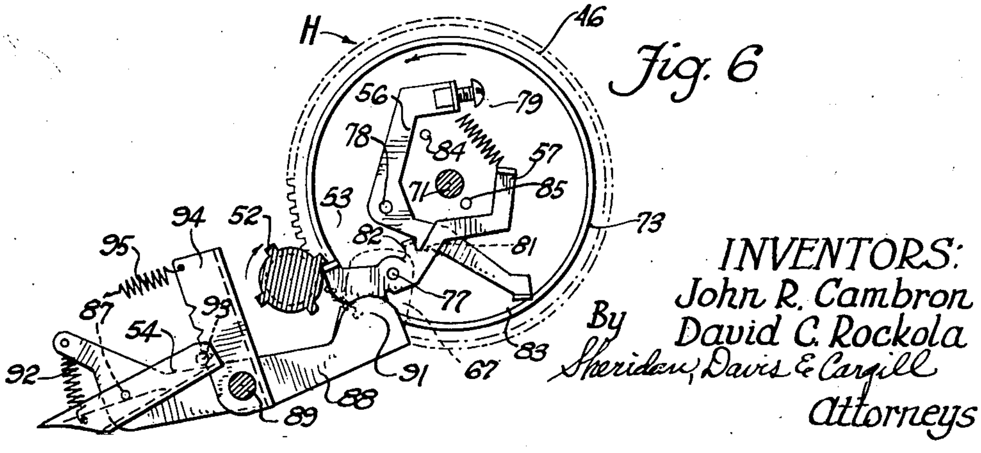
Fig. 6 is a view similar to Fig. 5 showing the control lever in normal position.

Referring now particularly to Figs. 5 and 6, trip lever 53 is pivotally mounted at 77 intermediate its ends on the upper side of the cam gear 46. Latch lever 56 likewise is pivotally mounted intermediate its ends on the upper side of cam gear 46 at 78. The rear end of latch lever 56, which extends upwardly through the aperture 76 in the cam disc 75, is provided with an adjustable actuating screw 79 adapted to be contacted by a lower arm of the record reproducer means D as the tone arm 36 moves to play-terminating position. The forward arm of latch lever 56 is provided with a shoulder 81 which cooperates with a lug or vertically disposed shelf 82 formed on the trip lever 53.

It will be noted from Figs. 5 and 6 that the distance between shoulder 81 on latch lever 56 and the pivot 78 of this lever is considerably greater than the distance between pivot 77 of trip lever 53 and the shelf 82 formed on the latter. The reason for this particular disposition of the cooperating shoulder 81 and lug 82 relative to their respective pivots 78 and 77 is to reduce to a minimum the force required to trip the levers 56, 53 from their full line to their broken line positions of Fig. 5 by movement to the left therein of the actuating screw 79. As will be appreciated from careful consideration of this view of the trip mechanism, counterclockwise tripping movement of latch lever 56 results in shoulder 81 being swung rearwardly away from lug 82. Such movement of latch lever 56 permits spring 57, which interconnects the rear end of the latter and the right end of trip lever 53, to swing trip lever 53 in a counterclockwise direction. Because of the previously noted difference between the radii of the resulting arcs of movement of shoulder 81 and lug 82, spring 57 is permitted to contract or shorten itself during such unlatching counterclockwise movements of levers 56, 53. In other words, tripping of latch lever 56 by the tone arm does not entail tensioning of spring 57, the spring being extended to its greatest length when levers 56, 53 are in their full line, latched position of Fig. 5, so that the force required to move latch lever 56 to its broken line position is only that necessary to overcome the inertia of this light lever, and spring 57 functions to impart the necessary follow-up, unlatching movement of trip lever 53 from its full line position of Fig. 5 in a counterclockwise direction to its broken line, operative position. Consequently, it is necessary only to apply a minimum force to screw 79 in order to actuate this novel trip mechanism. The importance of this arrangement will be appreciated when it is considered that the driving force for actuating the trip mechanism is derived from the swinging of the tone arm 36 by virtue of engagement of its needle 38 or 39 in the sound groove of a record. With this specific trip mechanism, the additional lateral reaction by the needle of the tone arm against the record groove in actuation of latch lever 56 is negligible.

After the trip mechanism has been actuated, it is again automatically reset to its full line position of Fig. 5 during the subsequent rotation of cam gear 46 by inward movement of the left end of trip lever 53, in a manner to be described in detail hereinafter. The resulting clockwise rotation of trip lever 53 functions to re-extend or tension spring 57, and shelf 82 is returned to latching engagement with shoulder 81 on latch lever 56. The forward end 83 of latch lever 56 is adapted to be moved inwardly by operation of reject lever 55 to render trip lever 53 operative, whenever it is desired to manually institute actuation of cam gear 46. A stop pin 84 extends upwardly from the cam gear 46 for limiting clockwise movement of latch lever 56 by spring 57, and a similar stop pin 85 is provided for limiting counterclockwise rotation of latch lever 53.

Control lever 54 is pivotally mounted intermediate its ends on a suitable pin 86 extending downwardly from the top plate 32, this lever being channel-shaped in vertical cross section with its open side at the rear edge thereof. As illustrated in broken lines in Figs. 2, 5 and 6 and shown in full lines in Fig. 8, the lower leg of lever 54 is cut away at its rear end to provide a camlike actuating edge surface cooperating with a pin 87 mounted on a lever 88, which in turn is pivotally mounted intermediate its ends on a vertical shaft 89 depending from the top plate 32 of the supporting frame A. The right end of this lever 88 also is channel-shaped in vertical cross section, the upper leg thereof terminating in an arm 91 which is shorter than the lower leg, the latter being designated by reference numeral 67 and functioning to cooperate with track switch 47 in the manner previously described. The left end of lever 88 is interconnected to control lever 54 by a suitable spring 92. At its inner end, lever 54 is provided with a vertically disposed pin 93 cooperating with the outer, notched edge of a positioning latch lever 94, which is pivoted at its forward end on the shaft 89. The rear end of latch lever 94 is urged outwardly by a coil spring 95, so that the outer notched edge of the latch lever is maintained in yielding engagement with the pin 93 on control lever 54. With this arrangement, swinging movement of control lever 54 about its pivot 86 results in movement of lever 88 either by actuation of pin 87 or spring 92 to the various positions illustrated in Figs. 5 and 6. The pin 93 engages one of the three notches in the forward edge of latch lever 94 to maintain this control mechanism in any one of its three possible positions previously described.

When control levers 54, 88 are disposed in their full line positions of Fig. 5, lever 88 is inoperative. When these control levers are moved to their intermediate broken line positions of Fig. 5, the lower end 67 of lever 88 is in position to cooperate with the track switch 47 (Fig. 9) in the manner previously described. When the outer end of control lever 54 is moved to its rearmost position, the inner end 91 of lever 88 is in its position of Fig. 6, wherein it cooperates with trip lever 53 to move the latter to an inoperative position where it cannot be engaged with spline 52, thus rendering the actuating mechanism H inoperable.

Reject lever 55 (Figs. 2, 5 and 8) is also pivotally mounted intermediate its ends on pin 86. The inner end of this reject lever 55 is connected by means of a spring 96 to a lever 97 which is pivotally mounted at one end in shaft 89 and is adapted to cooperate at its other end with the forward end 83 of latch lever 56, so that counterclockwise movement of the reject lever 55 from its full line position of Fig. 5 will be accompanied by similar swinging of lever 97 to actuate the trip mechanism to release trip lever 53 to initiate rotation of cam gear 46.

*Auxiliary record support mechanism*

Figure 8:
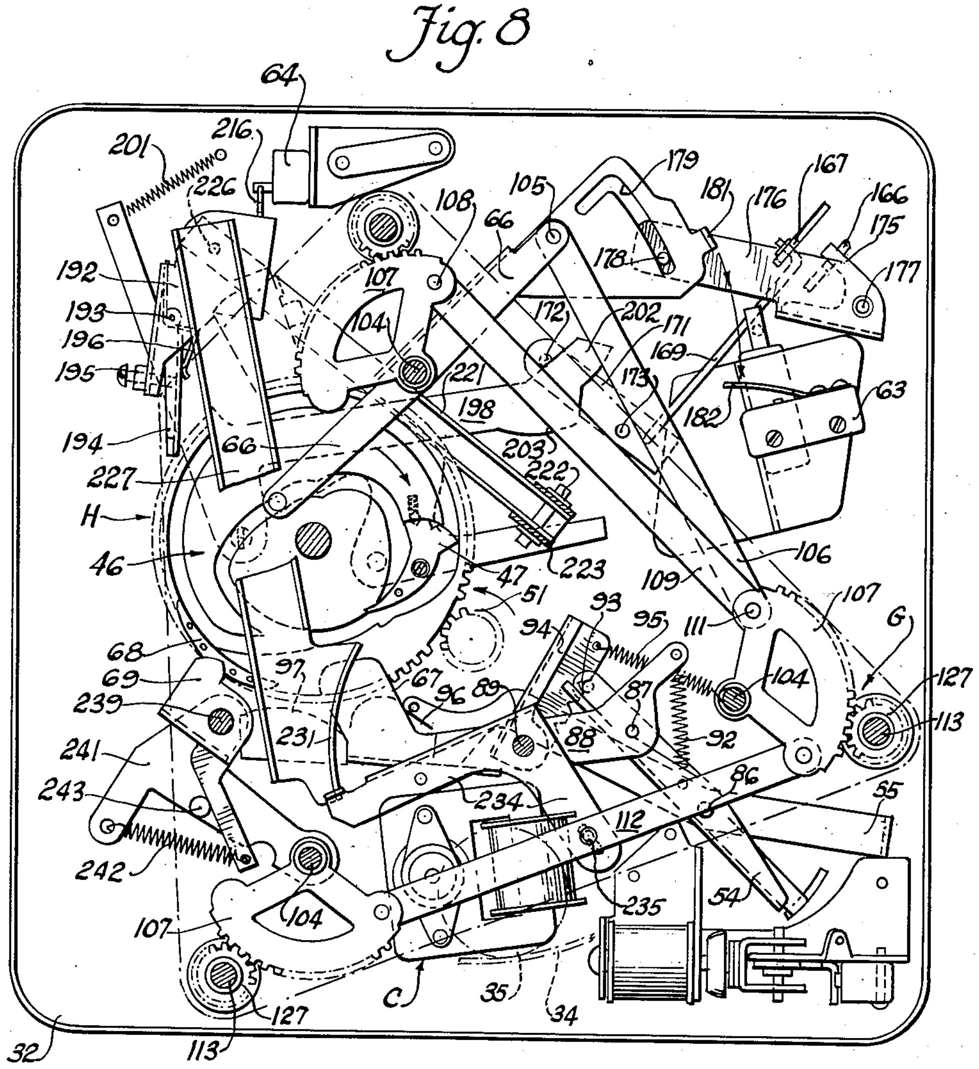
Fig. 8 is a bottom plan view similar to Fig. 7, with the bottom plate removed.

Referring particularly to Figs. 8 and 9, it will be seen that the outer and inner track grooves 48 and 49 of the actuating cam gear 46 provide the highest and lowest points, respectively, of this portion of the cam gear in the normal position of rest thereof, wherein pin 65 is in its broken line or full line position, respectively, of Fig. 9. Diametrically opposite these high and low points of the cam gear, the outer and inner grooves 48, 49 intersect to form a common intermediate point 98. It is at the inner end of this intersecting or common portion 98 of the cam grooves 48, 49 that the leading end of track switch 47 becomes effective when the track switch is in its full line position of these figures. Track switch 47 is pivotally mounted on the lower surface of cam gear 46 at 99 between the outer and inner grooves 48, 49. The forward end of switch 47 is provided with a depending pin 101 (Fig. 9) adapted to cooperate with the lower end 67 of lever 88 in the manner previously described. The rear edge of track switch 47 is provided with a pair of notches 102 for cooperation, respectively, in the two possible positions of the track switch with a spring-urged latch 103 mounted in any suitable manner in the rib portion of the cam gear 46 defined by grooves 48, 49. Track switch 47 is thus yieldably retained in either of its full or broken line positions of Fig. 9 by latch 103 co-acting with one or the other of the notches 102.

Figure 19:
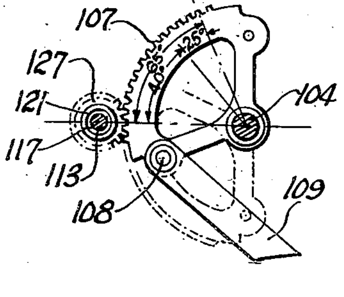
Fig. 19 is a detail sectional view taken substantially on the line 19—19 of Fig. 15.

Referring now to Figs. 1, 2, 7, 8, 9 and 15 to 19, the details of construction of the auxiliary record support means G and the connections between such mechanism and the actuating mechanism H will be described in detail. Three vertically disposed shafts 104 (Figs. 7 to 9, 15 and 19), spaced equal-distantly from each other and from the lower end of spindle 41, are mounted between the upper and lower plates 32, 33 of supporting frame A and secured thereto in any suitable manner. Actuating lever 66 (Fig. 9) is pivotally mounted intermediate its ends on the rear one of these vertical shafts 104, and is pivotally connected adjacent its rear end at 105 to one end of a link 106. Pivotally mounted on each of the three vertical shafts 104 is a gear sector 107 (Figs. 9, 15 and 19). The rearmost of these three gear sectors 107 is pivotally connected at 108 to one end of a link 109 which, in turn, is pivotally connected at its other end at 111 both to the intermediate gear sector 107 and to the forward end of link 106. The other or forward side of this intermediate gear sector 107 is similarly pivotally connected to the forward gear sector 107 by a link 112. With this arrangement, movement of lever 66 between its full and broken line positions of Fig. 9 by actuating cam gear 46 will result in simultaneous swinging of all three gear sectors 107 between their full and broken line positions.

Referring now particularly to Figs. 15 to 19, the connections between each gear sector 107 and its associated auxiliary record supporting wheel 45 will be described, it being understood that each wheel 45 is mounted, and actuated by the associated gear sector 107, in the same manner as each of the other wheels. Each wheel 45 is rotatably mounted in any suitable manner on the end of the upper, horizontally disposed portion of a right-angled shaft 113, the vertical portion of which is disposed laterally in relation to the plane of rotation of the wheel 45. Intermediate its ends, this vertical portion of shaft 113 has a disc cam member 114 centrally mounted thereon and rigidly secured thereto. The lower surface of this cam disc 114 is angularly disposed with relation to a horizontal plane, as best seen in Fig. 15. A companion cam disc 115 is rotatably mounted upon the vertical portion of shaft 113 for cooperation with cam disc 114, and is provided with an angularly disposed upper surface which is complemental to the angularly disposed lower surface of cam disc 114. This lower cam disc 115 is yieldably held in frictional contact with the upper cam disc 114 by means of a coil spring 116 mounted upon the lower end of shaft 113 and interposed between the lower surface of cam disc 115 and a retaining disc or washer 117 secured in any suitable manner to the lower end of shaft 113. A horizontally disposed roller or cam follower 118 is rotatably mounted upon a suitable shouldered screw secured at its inner end to and extending laterally from the lower cam disc 115. This cam follower 118 extends outwardly through a vertical slot 119 provided in the inner side wall of a hollow inner sleeve 121 which is provided with an enlarged, flanged portion at its upper end extending through a suitable aperture in the top plate 32 and rigidly secured to the latter in any suitable manner. A bearing ring 122, rotatably engaging the vertical portion of shaft 113, is mounted in any desired manner in the upper end of this stationary inner sleeve 121, a lower reduced portion of the sleeve 121 forming a housing for spring 116 and cooperating with disc 117, together with ring 122, as a guide for vertical and rotational movements of shaft 113, the lower end of sleeve 121 extending through a suitable aperture in the bottom plate 33. Rotatably mounted upon this inner sleeve 121, and extending between a suitable flanged outer surface adjacent the upper end of the latter and the bottom plate 33, is a hollow outer sleeve 123. This outer sleeve 123 is cut away intermediate its ends to provide a helically disposed cam track or edge surface 124 (best seen in Figs. 16 to 18) and a vertical edge surface 125 forming a continuation thereof. With this arrangement, rotation of the outer sleeve 123 relative to the inner sleeve 121 causes vertical displacement of cam follower 118 by engagement of the latter by the cam edge surface 124, such vertical movement of follower 118 being enforced by slot 119 in the stationary inner sleeve 121. When the cam follower 118 is thus moved upwardly to its top position, continued rotation of the outer sleeve 123 will swing the cam follower laterally into a horizontal disposed slot 126 (Figs. 17 and 18) communicating with and forming a continuation of the upper end of vertical slot 119 in the inner stationary sleeve 121, in a manner to be described hereafter in greater detail. The lower end of each outer sleeve 123 is formed to provide a pinion 127 which is in constant meshing engagement with the associated gear sector 107. Each of the auxiliary record supporting wheels 45 preferably is made of a suitable plastic material and provided on its peripheral surface with a friction tire or ring 128 of rubber, or the like.

The normal position of the three auxiliary record supporting wheels 45 is that illustrated in broken lines in Figs. 1 and 18, wherein they are disposed at the top of their movement and swung outwardly out of alignment with the turntable B. The normal cycle of operation of these wheels, as effected by actuating cam gear 46 and the mechanism just described, may be divided into four parts, namely: (I) inward swinging of the wheels 45 from their broken line to their full line positions of Figs. 1 and 18, which comprises a horizontal movement only through an arc of approximately 95 degrees; (II) downward vertical movement from the full line position of Fig. 18 to that of Fig. 16, during which the wheels are restrained against horizontal swinging; (III) upward vertical movement from the position of Fig. 16 to the full line position of Fig. 18; and (IV) outward swinging movement from their full line to their broken line positions of Figs. 1 and 18. When the control lever 54 is set as illustrated in Fig. 1 to result in the successive playing of the recording on the lower and upper surfaces of a plurality of records, successive complete rotations of cam gear 46 function to move lever 66 from its broken line to its full line position of Fig. 9 during the first rotation of the cam gear, and then from its full line to its broken line position of this figure during the succeeding rotation of the cam gear to effect this normal four part cycle. It will be understood that the wheels 45 are in their normal inoperative position, as illustrated in broken lines in Figs. 1 and 18, when the lever 66 is in its broken line position of Fig. 9. During the first half of a rotation of cam gear 46 in a clockwise direction as viewed in Fig. 9, with the wheels 45 in this normal inoperative position, the pin 65 will be moved by the outer cam groove 48 inwardly into the intermediate position 98 of the cam groove (which comprises a dwell in the cam), to swing each of the gear sectors 107 through an arc of 25 degrees from their broken line positions of Fig. 9. Such 25 degree rotation of each gear sector 107 will result in an initial 95 degree rotation of pinion 127 and outer sleeve 123. This results in a similar angular displacement of cam follower 118 from the end of the horizontal groove 126 in the stationary inner sleeve 121, in which it is normally disposed, to its position of Fig. 18, to move the wheels 45 from their inoperative position to an inwardly disposed, upper, record-receiving position. As previously explained herein, track switch 47 is normally in its broken line position of Fig. 9. Consequently, completion of this first rotation of cam gear 46 results in track switch 47 directing pin 65 into the inner cam groove 49, and this second half of the first rotation of the cam gear results in further inward movement of pin 65 to its innermost, full line position of Fig. 9. This additional inward movement of pin 65 results in continued swinging of each of the gear sectors 107 through an additional arc of 40 degrees to move them to their full line position of Fig. 9, which is the same position as that illustrated in full lines in Fig. 19. Such additional 40 degrees of arcuate movement of gear sector 107 results in continued rotation of the outer sleeve 123 from its position of Fig. 18 to that of Fig. 16. During such latter movement of sleeve 123, cam follower 118 is permitted by cam surface 124 to move downwardly under the weight of cam discs 115, 114, shaft 113, wheel 45 and the record supported by the latter. This constitutes the completion of portions I and II of the above described four-part cycle of operations.

The subsequent rotation of cam gear 46 effects portions III and IV of this cycle of operations. As previously described, during the first rotation of cam gear 46 pin 65 swung track switch 47 from its broken line to its full line position of Fig. 9 by contacting the rear portion of the inner edge thereof as the pin was directed thereby into the inner groove 49. Consequently, this second rotation of cam gear 46 results in pin 65 being moved from its full line position of Fig. 9 outwardly to its initial broken line position. Such movement is divided into two parts, the first being from its lowermost full line position of Fig. 9 to the intermediate position in which it is disposed in the intermediate dwell portion 98 of the cam groove. Such movement of pin 65 results in gear segments 107 being swung arcuately through 40 degrees from their full line position of Fig. 19 to rotate the outer sleeve 123 from its position of Fig. 16 to its full line position of Fig. 18, with a resulting lifting of wheel 45 by cam surface 124 raising cam follower 118. The additional outward movement of pin 65 effected during the second half of this second rotation of cam gear 46 by track switch 47 and the outer cam groove 48 completes the horizontal swinging movement of gear sectors 107 back to their broken line positions of Fig. 9, during which cam follower 118 is moved to the left from its position of Fig. 18 into slot 126 in the inner sleeve 121 to swing the wheel 45 outwardly to its normal inoperative position. The above described normal four-part cycle of operations of auxiliary record supporting wheels 45 is thus completed.

Whenever control lever 54 has been set to its intermediate broken line position of Fig. 5 to effect successive playing of the recordings on the upper sides only of a plurality of records, the lower end 67 of the lever 88 will be moved to its position of Fig. 9, as previously described, to cause swinging of track switch 47 from its broken line to its full line position of this figure during the first part of each rotation of actuating cam gear 46. Consequently, during each rotation of the cam gear, pin 65 will be moved from its broken line position of Fig. 9 to an intermediate position in the intermediate dwell 98 of the cam grooves and, during the second half of such rotation of cam gear 46, back outwardly to its normal, broken line position. The cycle of operations of the auxiliary record supporting wheels 45 will, under these circumstances, be altered to comprise: (I) inward swinging from their broken line to their full line positions of Figs. 1 and 18; and (IV) outward swinging from their full line to their broken line positions of these figures. The lowering and raising of wheels 45 incident to the playing of both sides of a plurality of records are thus eliminated. Such inward and outward swinging of wheels 45 results from reciprocation of gear sectors 107 through 25 degrees of movement by lever 66. This incremental rotation of gear sectors 107 is the same as that above described relative to phases I and IV of the first-outlined four-part cycle of operations. It will thus be seen that the positioning of control lever 54 alters the functioning of track switch 47 to determine either the first-described four-part cycle of operations of the auxiliary record supporting means G, or the second-described two-part cycle of operations thereof. In the four-part cycle, the wheels 45 are swung inwardly simultaneously from their normal inoperative position 45a of Fig. 15 to their record-receiving position 45b. The record moving means F is then actuated, in a manner to be described hereafter, to deliver a record from the record supporting means E to the wheels 45, such record then resting upon the wheels in its position of R′ of Fig. 15. The wheels are then lowered until they engage either the turntable B or a record or records mounted thereon, thus lowering the supported record to its position $R^2$ of this figure. If a plurality of records are mounted on the turntable, this downward movement of the wheels 45 will be arrested by the uppermost of these records, but the outer sleeves 123 will be rotated to their final position of Fig. 16 in the same manner as previously described, the cam surface 124 merely being moved out of engagement with the cam follower 118.

As soon as the record supporting wheels 45 engage the turntable B or the upper surface of a record or records rotating therewith, these wheels will be rotated thereby to rotate the record supported on the wheels in a direction opposite to the direction of rotation of the turntable to enable playing of the recording on the lower surface of the supported record, in a manner to be described in detail hereinafter. Following the playing of this recording, tone arm 36 actuates the trip mechanism, in the manner previously described, to institute a second rotation of cam gear 46. This second rotation of cam gear 46 first raises wheels 45 to lift the played record to its position R′ of Fig. 15, and then swings the wheels from this position 45b to their inoperative position 45a. During such outward swinging of the wheels 45, they are carried out of supporting engagement with the record thereon, and the latter is permitted to drop onto the turntable B or any records stacked thereon.

When control lever 54 has been moved to its intermediate position to cause the playing of the recordings on the upper surface only of the records on the supporting means E, the above described two-part cycle of operations of auxiliary supporting wheels 45 is effected, whereby each rotation of cam gear 46 results, first, in the inward swinging of wheels 45 to their record-receiving position 45b of Fig. 15, and secondly in the return swinging of the wheels to their inoperative position 45a to drop the record delivered thereto from its position R′ of Fig. 15 to the turntable B.

Throughout either the two-part or four-part cycles of operations of the wheels 45, spring 116 functions to maintain normal engagement between the lower cam disc 115, which is actuated by the cam follower 118 attached thereto, and the upper cam disc 114 which is secured to shaft 113. These cam discs 114, 115 and the spring 116 are provided, however, for the purpose of preventing injury to the parts of the auxiliary record supporting mechanism and the actuating mechanism which otherwise might result from an attempted manual displacement of the auxiliary record supporting wheels 45. In other words, these connections between the wheel supporting shafts 113 and their actuating mechanism permit manual displacement of the wheels 45 from any position thereof without damage to the machine, and also function to return the wheels to such position, when released after such manual displacement, so as to insure proper subsequent automatic actuation thereof. If the wheels 45 are in any of their positions illustrated in Figs. 15 to 18, any manual displacement thereof from any such position will result in similar displacement of cam disc 114 relative to cam disc 115, accompanied by contraction of spring 116, without effecting displacement of cam disc 115 or follower 118. Subsequent manual release of the wheel 45 will permit spring 116 and cam disc 114 to return shaft 113 to the position from which it was moved manually, the spring 116 being of sufficient strength to insure cam movement of disc 114 on stationary cam disc 115. These yieldable connections between the auxiliary record supporting wheels 45 and their actuating mechanism are of particular importance in a commercial machine, because no matter how strongly the operating public is warned against any attempt to move the wheels manually, there will always be some individuals who will attempt such movement, particularly the manual swinging of the wheels inwardly from their normal, inoperative broken line positions of Fig. 1.

*Record storage and moving mechanism*

The record storage means E and the record moving means F for supporting a plurality of disc records in stacked position and in spaced relationship to the turntable B, and for periodically and automatically delivering the lowermost of such records from the stack to the auxiliary record supporting means G, together form inter-related mechanism which will now be described in detail, with particular reference to Figs. 1, 2, 8 to 12, and 25 to 31. This mechanism includes the off-set spindle 41 (Figs. 12 and 29), the lower end of which is rigidly secured to the bottom plate 33 of the supporting frame A, as by means of a spacer ring 129 (Fig. 12) interposed between the bottom plate and an enlarged portion 131 of the spindle and a nut 132 screwed onto the lower threaded end of the spindle. The spindle 41 is stationary, extending upwardly through the hollow hub portion of turntable B, including pinion 51 and spline 52, and this lower portion of the spindle functions as a bearing for the turntable, the weight of the latter resting upon a suitable thrust bearing 133 mounted upon the enlarged portion 131 of the spindle and interposed between spacer ring 129 and the lower end of the hub turntable B. The major portion of spindle 41 is thus axially disposed relative to the turntable, and adjacent its upper end, the spindle is provided with a circumferentially reduced and angularly disposed portion 134 (Fig. 29) which is further reduced at its upper end or cut away to provide a substantially horizontal shelf 135. The spindle terminates at its upper end above this reduced portion 134 in a normal-sized end portion 136 off-set from, and slightly angularly disposed relative to, the main body portion of the spindle. When any disc records R are placed over the spindle 41 with their center holes engaged by this top end 136, the lowermost of such records will have a part of the marginal portion surrounding its center hole resting upon and supported by the shelf 135. In other words, vertical movement of a record down the upper portion 136 of the spindle will be terminated by the shelf 135. The lower end of this upper portion 136 is spaced vertically above shelf 135 a distance slightly greater than the maximum thickness of a disc record. Consequently, translational movement of a record from this arrested position on shelf 135, as thus permitted by such spacing, will result in the record being displaced from engagement with shelf 135 to enable further downward movement of the record on spindle 41. This laterally displaced position of a record is illustrated in Fig. 29, wherein the lowermost record in a stack mounted on the upper end portion 136 of spindle 41 is shown as displaced to the right a sufficient distance to clear it of engagement by shelf 135. In addition to such central support for a stack of records, as provided by the shelf 135 and the upper end 136 of spindle 41, the record supporting means E includes mechanism for marginally supporting the stacked records. Such marginal support, now to be described, also includes push-off mechanism, comprising the record moving means F, for translationally moving the lowermost record in the stack in the manner just described.

A member 137 (Figs. 25 and 26) having vertically disposed, spaced leg portions, comprises the supporting frame for this marginal record support and push-off mechanism, and is rigidly secured to the upper plate 32 of frame A by suitable screws 138. Mounted in any suitable manner on the leg-connecting portion of this frame 137 is a bracket 139 having a horizontally disposed portion with an aperture therethrough for guiding vertical movements of the control rod 44. A pair of horizontally disposed arms 141 are attached in any desired manner to the upper ends of the frame 137 for supporting, adjacent their end portions, a pair of transverse and horizontally disposed pins 142. A channel-shaped, horizontally disposed, bottom slide member 143 has its main body portion interposed between the arms 141, and is provided adjacent the ends thereof with horizontal slots 144 engaging the pins 142 to slidably support this member for limited horizontal movement relative to the frame 137. An upper plate or slide 145 (Figs. 25, 26 and 28 to 30) is mounted for horizontal movement on the out-turned, flanged upper ends of the bottom slide 143. Relative movement between slides 143 and 145 is limited and guided by screws 146 anchored in the bottom slide 143 and extending upwardly through cooperating slots 147 in the upper slide 145. Extending vertically through a suitable aperture in the upper slide 145 is a latching plunger 148 having a coil spring 149 (Figs. 25 and 29) mounted thereon and interposed between a suitable transverse pin in the stem of the plunger and the slide 145 to resiliently maintain this plunger in its uppermost position. Below slide 145, the plunger 148 is enlarged to limit upward movement thereof by the spring 149, and is provided at its lower end with a flanged head 151. The flanged portion of the head 151 normally engages the under surface of the bottom slide 143, and the body portion of this head is adapted to be maintained in one or the other of the enlarged end portions of a longitudinally disposed bayonet slot 152 provided in the lower portion of the slide 143 (Fig. 28). The plunger 148 has a reduced portion 153 directly above the head 151 (Fig. 29) slightly smaller in diameter than the width of the central portion of slot 152. The head 151 and reduced portion 153 of plunger 148 and the bayonet slot 152 permit limited longitudinal sliding of the upper slide 145 relative to the bottom slide 143 upon depression of plunger 148 against the action of spring 149. The spring functions normally to maintain the plunger in its uppermost position, with the body portion of the head 151 engaging one or the other of the enlarged ends of the bayonet slot 152, to latch the slides 145 and 143 together and prevent unintentional relative movement therebetween.

Figure 25:
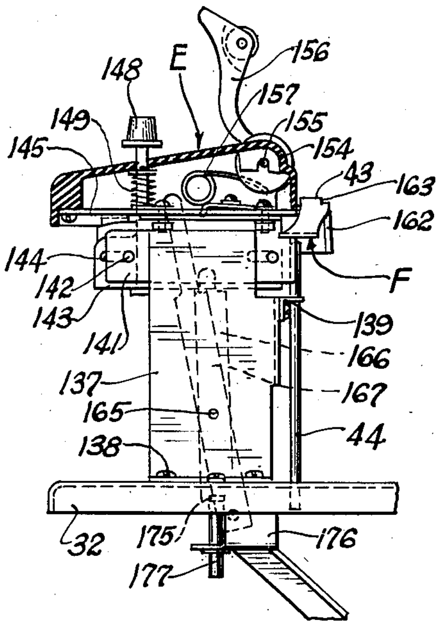
Fig. 25 is a detail side elevation, as viewed from the lower left corner of Fig. 1, of the record peripheral support mechanism and the record moving off push off mechanism, with the lower housing therefor removed and the upper housing in section.

Mounted on the upper slide 145 and rigidly connected thereto in any suitable manner is a cover member 154 of hard rubber, plastic, or the like, formed at its inner end to provide the marginal record-supporting shelf 42. The above-described mounting of the upper slide 145 on the bottom plate 143 enables selective positioning of the upper slide, the cover 154 and its record supporting shelf 42 in either its position of Fig. 1 for marginally supporting ten inch records in stack on the upper end 136 of spindle 41, or in an outwardly displaced position relative to the bottom slide 143 for supporting twelve inch records in stack, as shown in Fig. 25.

Figure 26:
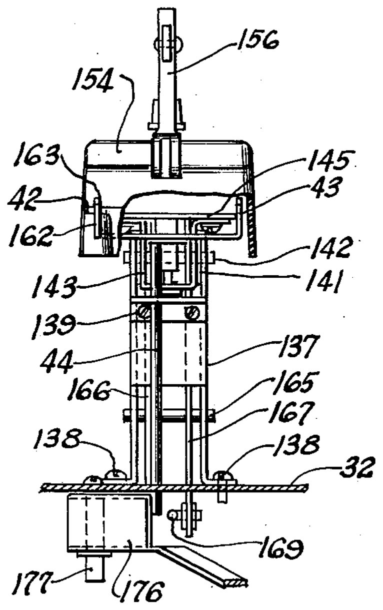
Fig. 26 is a detail elevational view, as seen from the right side of Fig. 25.
Figure 27:
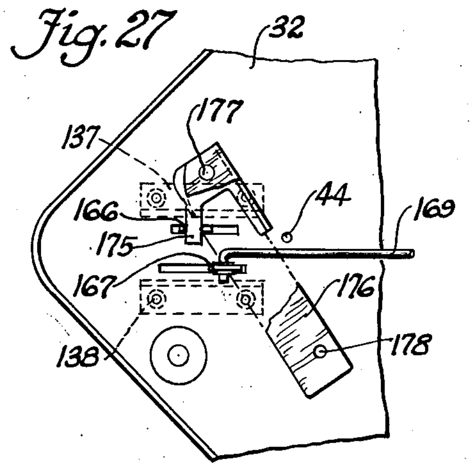
Fig. 27 is a bottom plan view of the mechanism of Fig. 25.
Figures 30, 31:
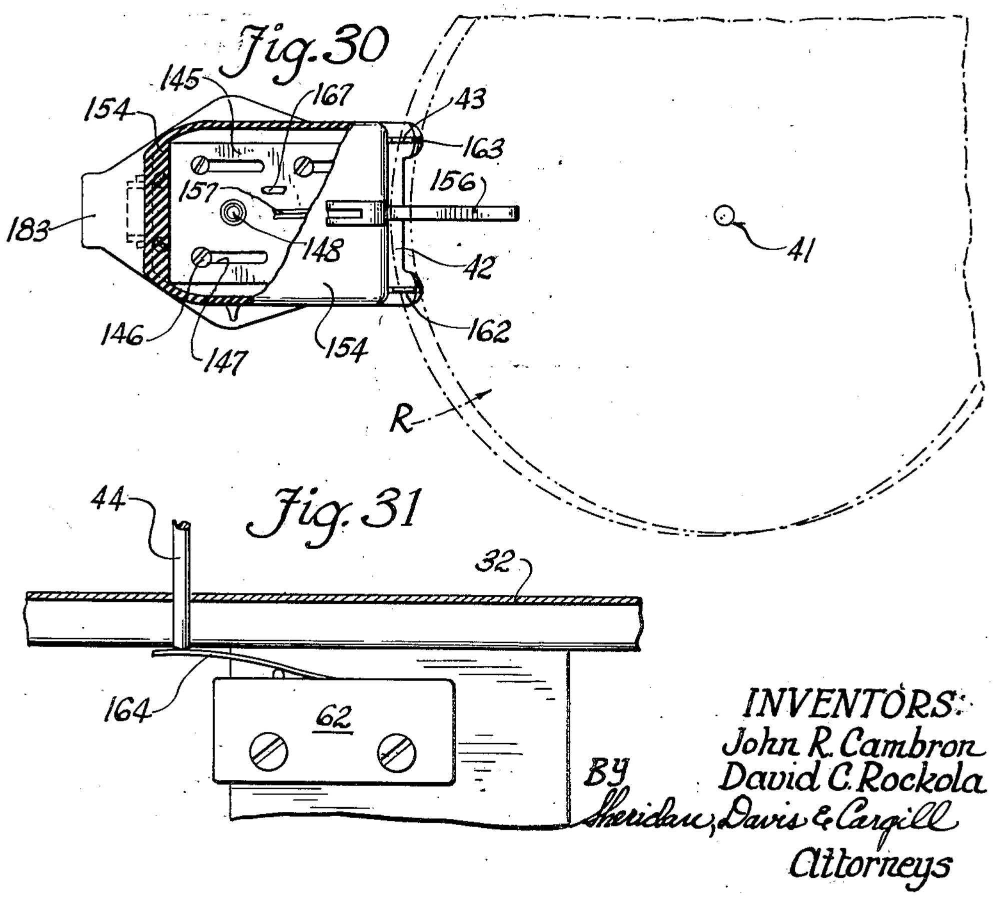
Fig. 30 is a top plan view of the mechanism of Fig. 29, with parts thereof broken away.
Fig. 31 is an enlarged detail elevation of the control switch operated in response to the absence of records in the storage means, as seen from the right of Fig. 22.

The cover 154 supports a transverse shaft 155 adjacent its forward end (Figs. 25 and 29) upon which is rotatably mounted the outer end of a record hold-down latch 156, the inner end of which is provided with a suitable roller for engaging the topmost record in stack on the upper end 136 of spindle 41. A spring 157 is mounted on the upper slide 145 interiorly of cover 154 for engagement with the inner end of latch 156 so as, either to releasably maintain the latch in its inoperative position of Fig. 25, or to urge the inner end of the latch into engagement with the stacked records when in its operative position of Fig. 29, the inner end of the latch being formed in well known manner to accomplish these results. Adjacent its rear end, the upper slide 145 is provided with depending brackets 158 (Figs. 25 and 29), either secured thereto in any suitable manner or formed integrally therewith, for pivotally supporting the outer ends of an inwardly extending yoke 159 rigidly secured at its inner end by a connecting piece 161 to the transverse portion of the push-off slide 43. As best seen in Fig. 26, this transversely disposed push-off slide 43 terminates in upwardly extending end portions disposed in suitable slots 162 in the shelf portion 42 of the cover 154. The upper edges of these end portions of push-off slide 43 have their outer corners cut away to provide a record engaging shoulder 163. The push-off slide 43 is normally maintained in its uppermost position of Figs. 25 and 26 by control rod 44, the lower end of which is urged upwardly by a suitable leaf spring 164 (Fig. 31). Consequently, the weight of a record or records placed on record supporting means E will depress push-off slide 43 to its position of Fig. 29 against the action of spring 164 to cause the latter to open the normally closed control switch 62.

The legs of the frame member 137 support a horizontal rod 165 (Figs. 25, 26 and 29) upon which are pivotally mounted a push-off lever 166 and a longer lever 167 for setting the mechanism for controlling the initial playing position to which tone arm 36 will be moved for engaging the outermost sound groove on either a ten or a twelve inch record. The upper end of this lever 167 extends upwardly through a clearance slot 168 in the bottom slide 143 (Fig. 28) and through a suitable aperture in the upper slide 145, so that movement of slide 145 relative to the bottom slide 143, in the positioning of shelf 42 for marginally supporting either ten or twelve inch records, will be transmitted to lever 167 to swing the latter between its positions of Figs. 25 and 29. The lower end of lever 167 is connected by a rod 169 (Figs. 2, 3, 8, 27 and 29) to the inner end of a control lever 171. Control lever 171 is pivotally connected at its outer end at 172 to the top plate 32, and is provided intermediate its ends with a vertical pin 173 for determining the initial playing position to which the reproducer means D will be moved automatically.

The upper end of push-off lever 166 engages within a suitable slot 174 (Fig. 28) in the lower portion of bottom slide 143. The lower end of this push-off lever 166 is forked and embraces an upper arm 175 of a push-off link 176 (Figs. 26 and 27) which is pivoted at its outer end on a suitable pivot pin 177 depending from the top plate 32. The lower arm of push-off link 176 is provided adjacent its inner end with a vertical pin 178 which slidably engages an L-shaped slot 179 in a rearward extension of the auxiliary record supporting mechanism actuating lever 66 (Fig. 9).

As will be recalled from the previous description of the auxiliary record supporting means G, when the wheels 45 are in their normal inoperative position, as illustrated in broken lines in Fig. 1, the actuating lever 66 is in its broken line position of Fig. 9. In this latter position of lever 66, pin 178 is disposed in the short arm of slot 179 and push-off link 176 is held in its normal broken line position of Fig. 9. It should be noted that a finger 181, provided on the outer end of actuating lever 66, in this normal position of the lever is held against a spring 182 to maintain control switch 63 closed. This normal position of push-off link 176 is that illustrated in Fig. 25. During counter-clockwise movement of actuating lever 66 (as viewed in Fig. 9) from such normal position, during the first portion of a rotation of cam gear 46 to swing the wheels 45 inwardly to their record-receiving position, as previously described, pin 178 is first moved into the long arm of slot 179 while the wheels 45 are being swung inwardly, and is then moved by this portion of slot 179 to swing push-off link 176 to its full line position of Fig. 9. Such actuation of link 176 swings push-off lever 166 from its position of Fig. 25 to its position of Fig. 29 to thereby move the lower and upper slides 143 and 145 and push-off slide 43 inwardly on supporting pins 142, as limited by slots 144 in the bottom slide 143. It will be understood that this push-off action thus takes place automatically during the first portion of either the two-part or the four-part cycle of operations of actuating mechanism H previously described. This push-off action does not affect any of the records R supported in stack on the upper part 136 of spindle 41, except the lowermost one thereof. The several parts of the record support and moving mechanism are so designed that the lowermost record is peripherally engaged by the record-engaging shoulders 163 on the upper ends of push-off slide 43 when the latter is in its normal retracted position. Consequently, such inward actuation of the push-off mechanism to its position of Fig. 29 results in this lowermost record in the stack being moved inwardly out of engagement with the shelf 135 on spindle 41 to permit it to fall onto the auxiliary supporting wheels 45, as shown at R' in Fig. 15. This record is then moved to its position R² of Fig. 29, in the previously described four-part cycle of operations, for playing the recording on the lower side thereof by downward movement of the wheels 45. If control lever 54 has been set to effect the previously described two-part cycle of operations, or in the last portion IV of a four-part cycle, the wheels 45 are swung outwardly to their inoperative position, and during such outward swinging of wheels 45, the push-off and marginal supporting mechanism is returned to its retracted position by actuating lever 66. The record now lowermost in the stack will drop into engagement with the shoulders 163 on push-off slide 43, upon such return of the push-off mechanism to its retracted position, the marginal portion of the record surrounding its center hole having dropped into engagement with shelf 135 on spindle 41 immediately following delivery of the previously lowermost record to the wheels 45. Consequently, subsequent successive actuations of the push-off mechanism will deliver serially the lowermost record in the stack, one at a time, to the wheels 45 each time that the latter are moved from their normal, inoperative, broken line positions to their record-receiving, full line positions of Fig. 1. Such delivery of the last record in the stack will result in spring 164 (Fig. 31) raising push-off slide 43 to its normal position of Fig. 25, through the agency of rod 44, to permit control switch 62 to return automatically to closed condition. As shown in Figs. 1, 29 and 30, a suitable housing 183 of hard rubber, plastic, or the like, is provided for the lower portion of the record supporting and push-off mechanism, which is removably secured in any suitable manner to the top plate 32 and surrounds frame 137 and associated parts.

*Reproducer mechanism*

Figure 10:
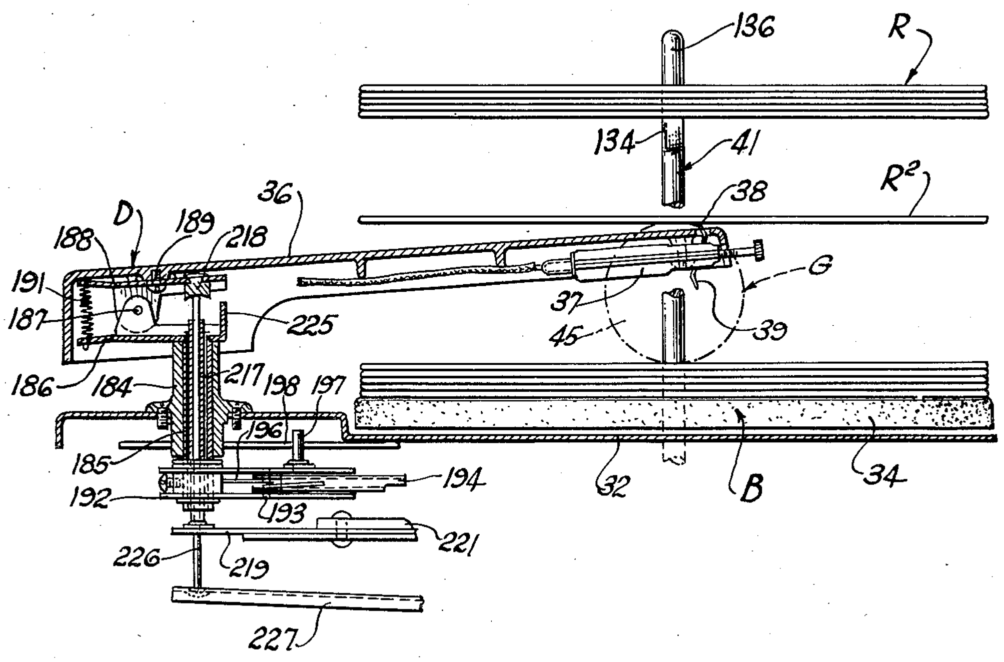
Fig. 10 is a vertical sectional view taken through the tone arm when in its full line position of Fig. 1, as seen from the left side of the latter figure.
Figure 11:
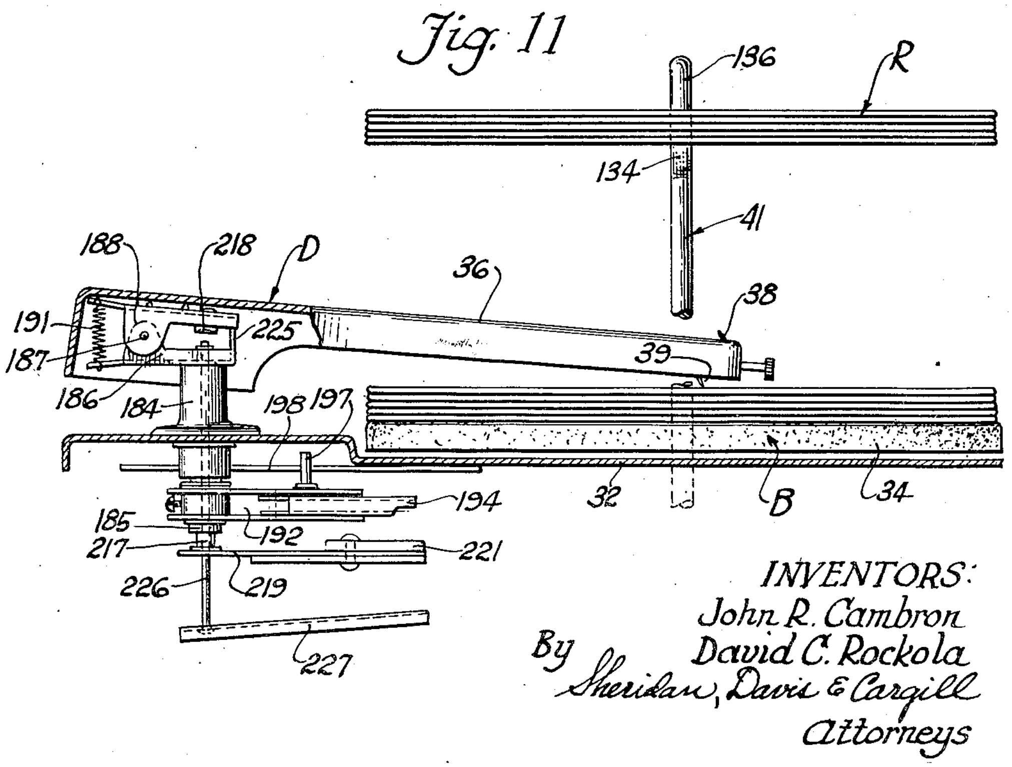
Fig. 11 is a vertical elevational view of the tone arm mechanism, as seen from the same point as Fig. 10, showing the tone arm in initial playing position in engagement with the upper side of a record.

With reference to Figs. 1 to 14, the reproducer means D will now be described in detail, including the specific mounting of the tone arm 36 and the connections between the tone arm and the actuating mechanism H for automatically swinging the tone arm horizontally and for controlling vertical movements thereof for engaging and disengaging the stylus or needle 38 or 39 with the under or upper side, respectively, of a record to be played. As illustrated in detail in Fig. 10, a vertically disposed, hollow post or sleeve 184 extends through a suitable aperture in the top plate 32 of the supporting frame A and is rigidly secured thereto in any desired manner. This post 184 rotatably houses a hollow sleeve or tube 185 the upper end of which is rigidly secured in any suitable manner to a lower tone arm mounting bracket 186, which is supported by the upper end of post 184. The rigid connection of bracket 186 to the tube 185, while permitting rotation thereof relative to the post 184, prevents tilting of the bracket out of its normal horizontal plane. This lower bracket 186 is pivotally connected at 187 intermediate its ends to an upper tone arm mounting bracket 188 to which the tone arm 36 is secured, as by means of screws 189. The tone arm 36 is spring-mounted to balance the weight thereof and provide proper stylus or needle pressure on needle 39, when the recording on the upper side of a record on turntable B is being played, as illustrated in Fig. 11, by means of a coil spring 191 interconnecting the outer end portions of the brackets 186 and 188.

A channel-shaped tone arm actuating lever 192, having the parallel arms thereof horizontally disposed, is provided with a suitable hub portion mounted upon and rigidly secured in any desired manner to the lower end of the rotatable sleeve 185 below post 184. Pivotally mounted between the horizontal arms of lever 192, on a pin 193 (Figs. 8 and 10), is the outer end of a trip mechanism actuating lever 194 which is normally held in engagement with the inner end of an adjusting screw 195, mounted in the vertical web portion of lever 192, by a coil spring 196 mounted on pin 193. This spring-tensioned mounting of lever 194 on lever 192 enables positive movement of latch lever 56 of the grip mechanism from its full line to its broken line position of Fig. 5 by the inner end of lever 194 when the tone arm 36 is moved to its play-terminating position 36c, while permitting manual movement of the tone arm to a forward inner position followed by outward swinging return of the tone arm, during which screw 79 of the trip mechanism is in the path of movement of the outer end of lever 194, without any damage to the mechanism. In other words, spring 196 enables outward swinging of the inner end of lever 194 past screw 79 of the trip mechanism, if the lever has been moved inwardly beyond the screw. Screw 195 is selectively adjustable to vary the play-terminating point of contact of lever 194 with screw 79 of the trip mechanism. It will be understood, of course, that lever 192 accompanies the tone arm 36 in all horizontal swinging movements of the latter. The upper arm of lever 192 is provided with an upwardly extending tracer pin 197 (Figs. 3 and 10) for imparting horizontal swinging movements to this tone arm lever and the tone arm 36.

Figure 2:
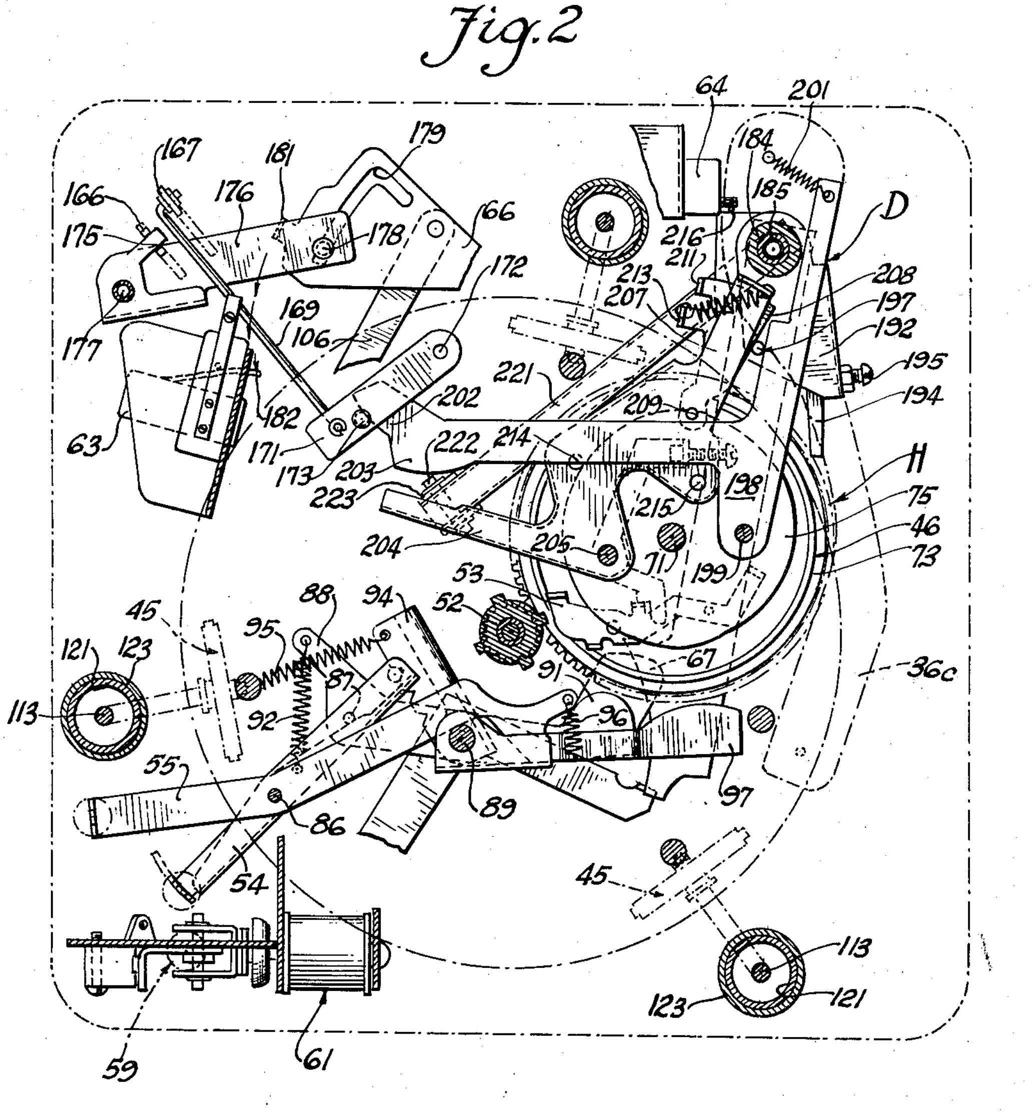
Fig. 2 is a sectional view showing the actuating mechanism of the phonograph as seen from the top and just below the mounting plate, with the parts in their positions of Fig. 1.
Figure 3:
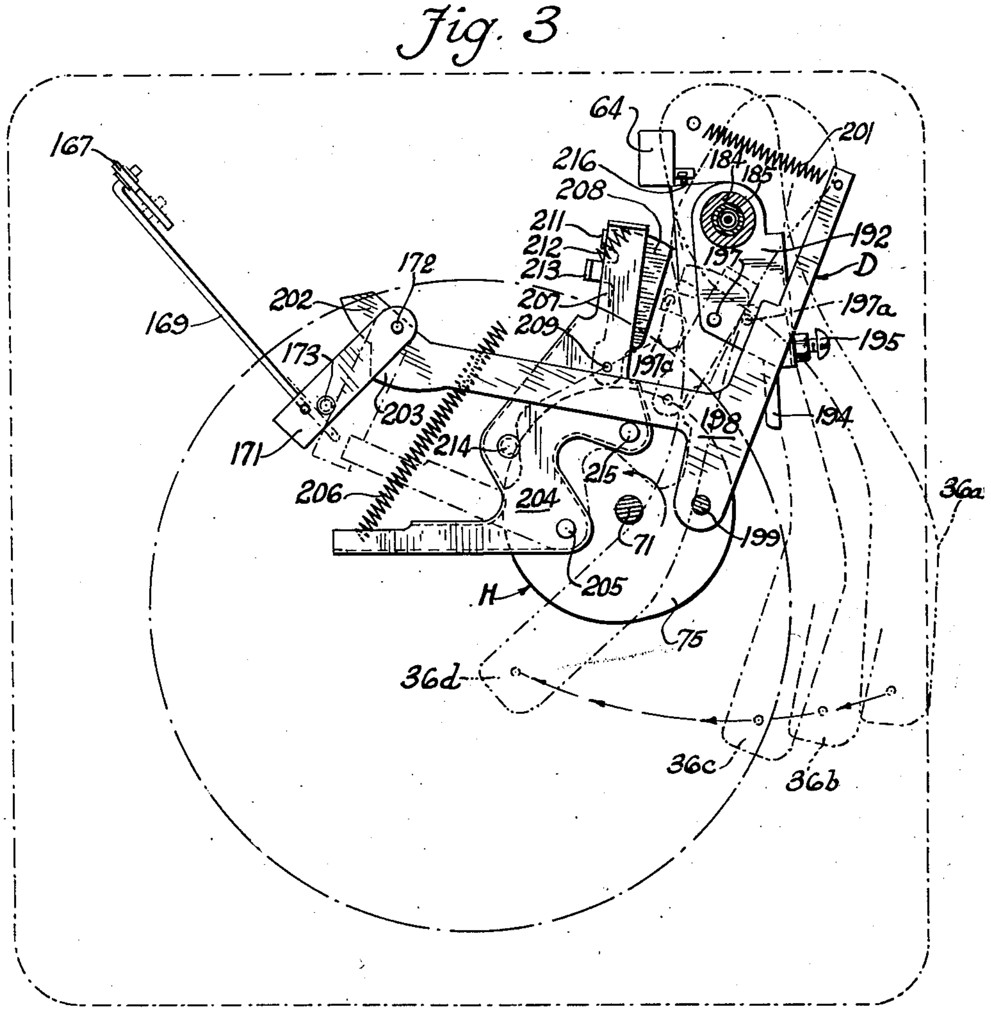
Fig. 3 is a view similar to Fig. 2 showing the linkage for automatically imparting horizontal swinging movements to the tone arm.

The means for swinging tone arm 36 inwardly from its inoperative, outermost position 36a of Fig. 3 to either of its initial playing positions 36b or 36c comprises a bell crank lever 198 pivotally mounted on a pin 199 depending from the top plate 32 and urged in a counterclockwise direction (as seen from above in Fig. 3) by a coil spring 201 attached to the outer end of the rearwardly extending arm of the lever. This rearwardly extending arm of lever 198 is disposed in the path of movement of the tracer pin 197, as shown in Fig. 10. Referring to Figs. 2 and 3, the other arm of this bell crank lever 198 terminates in a finger portion 202 and is provided inwardly thereof with a forward extension 203, either of which is adapted to limit counterclockwise swinging of lever 198 by spring 201 by contact with pin 173 on lever 171. When lever 171 has been moved to its position of Fig. 2, by inward sliding of the peripheral supporting shelf 42 of the record supporting means E to its position of Fig. 1, as previously described, extension 203 on bell crank lever 198 will clear pin 173, so that spring 201 will move lever 198 to its position of Fig. 2, as limited by contact of finger 202 with pin 173, to swing the tone arm of its ten inch record initial playing position 36c. Setting of the record supporting means E to its outermost position of Fig. 25 for peripherally supporting twelve inch records, however, will result in inward swinging of lever 171 to its broken line position of Fig. 3. In this position, pin 173 is in the path of movement of extension 203 of bell crank lever 198, whereby inward swinging of the tone arm by spring 201 will be terminated automatically at the initial playing position 36b for twelve inch records. It will be understood, of course, that from either of these two initial playing positions 36b or 36c, the tone arm is swung inwardly to its play-terminating position 36d by engagement of one or the other of needles 38 or 39 with the groove of the record being played.

The means for returning tone arm 36 from such play-terminating position 36c to its inoperative position 36a comprises a bell crank lever 204 (Fig. 3) pivotally mounted on a pin 205 depending from the top plate 32. The end of the forward arm of this lever 204 is connected to a coil spring 206 adapted to swing the lever in a clockwise direction (viewing Fig. 3). The rear arm of bell crank lever 204 terminates in an end portion 207 having a spring-loaded arm 208 pivotally mounted thereon at 209. The outer end of arm 208 terminates at its inner edge in an upwardly extending lug 211 normally held in engagement with the inner edge of arm 207 by a spring 212 interconnected between a similar lug 213, spaced inwardly from lug 211, and the outer end of arm 207. With this arrangement, arm 208 is normally held by spring 212 in its full line position of Figs. 2 and 3, but is adapted to be swung in a counter-clockwise direction against the action of the spring in a manner to be later described. Both of the arms 207 and 208 are disposed vertically in the path of movement of tracer pin 197, so that clockwise movement of bell crank 204 from its position of Fig. 3 by spring 206 may result in outward swinging of the tone arm thereby to its inoperative position 36a. If the parts are free to move to this position, they will do so because spring 206 is sufficiently strong to overcome the action of and extend spring 201.

Figure 4:
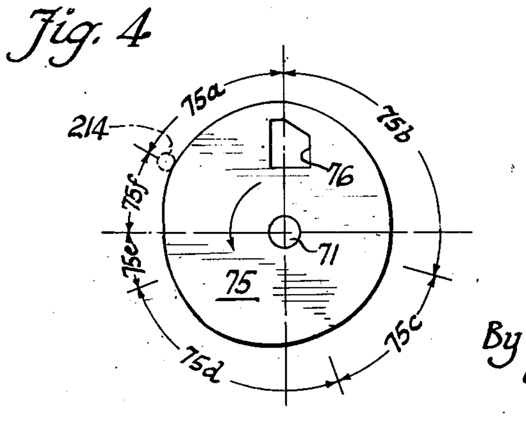
Fig. 4 is a diagrammatic view of the tone arm swinging cam of Fig. 3 illustrating the different phases of operation thereof.

The means for cyclically controlling the above-described actions of bell crank levers 198 and 204 comprises the eccentric edge cam 75 mounted on cam gear 46 (Fig. 12), a pin or roller 214 depending from bell crank 204 for engagement with the periphery of this cam, and a pin 215 extending upwardly from bell crank 204 for engagement with the forward edge of the inner arm of bell crank 198. In considering the specific details of operation of this mechanism for swinging tone arm 36 horizontally, particular reference will be had to Fig. 4 which depicts the several phases of each cycle of operations of cam disc 75. Cam 75 is shown in Fig. 4 in the same position relative to follower 214 of bell crank 204 as illustrated in Fig. 3. This comprises the normal or rest position of cam 75, and cam gear 46 to which it is attached, and is the position assumed thereby immediately following automatic termination of a complete cycle of the machine, as effected by the tone arm 36 in the manner previously described. Therefore, the tone arm is in its innermost position 36d of Fig. 3 and the bell cranks 198 and 204 are in their full line positions of this figure. It should be noted that in this normal inoperative position of the mechanism, free manual outward swinging of tone arm 36 is permitted, since the rear arms of bell cranks 198 and 204 are both out of the path of movement of tracer pin 197.

As either a four-part or two-part cycle of operations of the machine is instituted, the initial portion 75a (Fig. 4) of cam 75 is moved in a counter-clockwise direction past roller 214 of bell crank 204, spring 206 functioning to maintain the roller in contact with the cam at all times. This initial portion 75a of the cam comprises a dwell, being a portion of the cam having the maximum radius, and such radius being uniform throughout such portion 75a. This dwell is provided for the purpose of permitting mechanism (to be described hereafter) to move the record engaging end of tone arm 36 vertically to its normal neutral position out of engagement with the record last played. The following portion 75b of cam 75, which thereafter passes follower 214, permits spring 206 to move bell crank 204 from its full line to its broken line position of Fig. 3 to swing tone arm 36 outwardly to its inoperative position 36a. During such clockwise swinging of bell crank 204, bell crank 198 is first swung in a counterclockwise direction or inwardly by spring 201, such being permitted by the resulting inward movement of pin 215 away from the inner arm of bell crank 198, tracer pin 197 is picked up by spring-loaded arm 208, and, as tracer pin 197 encounters the rear arm of bell crank 198, this spring-loaded arm 208 is swung inwardly against the action of its spring 212 until the tracer pin is engaged by the rearward arm 207 of bell crank 204. Continued clockwise movement of bell crank 204 results in bell crank 198 being returned to its full line position of Fig. 3 by the tracer pin 197, spring 206 being sufficiently strong to overcome and extend spring 201, as previously noted. Consequently, this action of spring 206, as permitted by the receding portion 75b of cam 75, results in the positioning of the tone arm in its inoperative position 36a, movement of tracer pin 197 to its broken line position 197a of Fig. 3, and swinging of bell crank 198 to its full line position and bell crank 204 to its broken line position of this figure.

The succeeding portion 75c of cam 75 comprises another dwell. During the movement of this part of the cam past follower 214, as well as during movement of portion 75b therepast, the auxiliary record supporting means G is operated in the manner previously described either to bring a record from the stack on supporting means E to its intermediate playing position $R^2$ of Fig. 10, or to its lowermost playing position on the turntable B, as shown in Fig. 11. It will be understood that the actual lowering of a record from stack position takes place only during the active period of this dwell portion 75c, but that wheels 45 are swung inwardly from their normally inoperative position of Fig. 1 while portion 75b of cam 75 is active, the wheels 45 functioning to protect tone arm 36 during its outward swinging, in the manner previously described.

The next succeeding portion 75d of cam 75 now passes follower 214 and, since it comprises a rising portion of the cam, follower 214 is moved outwardly to swing bell crank lever 204 to its position of Fig. 2, against the action of spring 206, from its broken line position of Fig. 3. During such counter-clockwise swinging of bell crank 204, spring 201 swings bell crank 198 in a counter-clockwise direction from its position of Fig. 3 to that of Fig. 2, where it is arrested by engagement of its finger 202 with pin 173 on control lever 171. It will be noted that in this position of the parts shown in Fig. 2, arm 208 is still in its retracted position. The specific purpose of this spring-loaded arm 208 will now become apparent. If control lever 171 had been disposed in its broken line position of Fig. 3, by virtue of a pre-setting of shelf 42 of the record supporting means E to its outermost position for supporting twelve inch records, this inward tone arm actuating movement of bell crank 198 would have been terminated at an earlier point by contact of forward extension 203 of the bell crank with pin 173. However, counter-clockwise swinging of bell crank 204 by cam portion 75d would have continued to bring the bell crank to its position of Fig. 2. Movement of tracer pin 197 having been stopped by engagement of extension 203 with pin 173, spring 212 would then have been permitted to function to swing arm 208 outwardly to its position of Fig. 3 relative to arm 207. The position of the parts illustrated in Fig. 2 is that in which the tone arm has been moved inwardly to its position 36c for initial engagement with a ten inch record. This other described position of the parts would be that in which the tone arm had been swung inwardly to its initial playing position 36b for engagement with the outer playing groove of a twelve inch record. Consequently, it will be seen that during any inward swinging of the tone arm from its inoperative position 36a to either of its initial playing positions 36b or 36c, it will be restrained against any other horizontal movement, because tracer pin 197 will be engaged both by the rear arm of bell crank 198 and either arm 208 or arms 207 and 208 of bell crank 204.

The next succeeding portion 75e of cam 75 comprises a dwell of intermediate radius during the active phase of which the outer end of tone arm 36 is moved vertically, in a manner to be described in detail hereafter, to engage either stylus 38 or 39 with the record positioned for playing. Because of the above-described arrangement and operation of bell cranks 198 and 204, including spring-loaded arm 208, the tone arm will be maintained with its needles in proper vertical alignment with the starting groove on either the lower or upper surface of either a ten or twelve inch record in initial playing position during vertical movement of the forward end of the tone arm to engage either needle 38 or needle 39 with such starting groove.

The next succeeding and final portion 75f of cam 75 continues the outward movement of follower 214 to swing bell crank 204 counter-clockwise from its position of Fig. 2 to its full line position of Fig. 3, where it is retained by the stopping of the cam 75 in its position of Figs. 3 and 4. During this final counter-clockwise swinging of bell crank 204, pin 215 thereon engages the forward edge of the inner arm of bell crank 198 to swing the latter in a clockwise direction against the action of spring 201 from its position of Fig. 2 to its position of Fig. 3. Consequently, arms 207 and 208 of bell crank 204 thus are retained out of the path of movement of tracer pin 197 as the tone arm 36 is swung inwardly by engagement of its stylus with the sound groove of the record being played, and bell crank 198 is retained out of the path of movement of tracer pin 197 so that the tone arm may be disengaged manually from the record being played, or last played, and swung outwardly to its inoperative position 36a without any spring resistance being offered to such manual movement thereof.

The rear end of the lower arm of tone arm actuating lever 192 is so disposed as to contact the lower portion of an arm 216 (Figs. 2, 3, 5, 8 and 23), mounted at its upper end in the actuating shaft of the control switch 64, when the tone arm reaches its play-terminating position 36d, to actuate this arm 216 to close the normally open switch 64. The motor C thus is de-energized, if control switches 62 and 63 have been closed, in the manner previously described.

Figure 13:
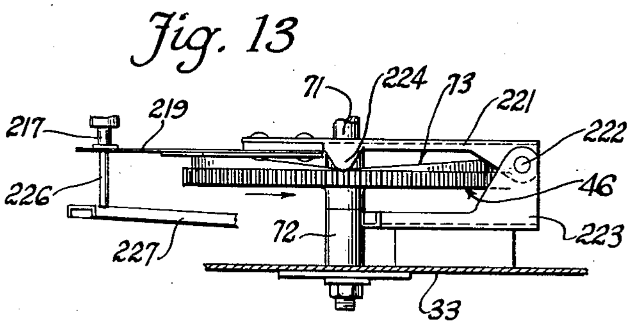
Fig. 13 is a detail elevational view showing the mechanism for moving the stylus end of the tone arm vertically between neutral and lower positions.

Referring again to Fig. 10, the hollow tube 185 rotatably mounted within tone arm supporting post 184 has a hollow, floating sleeve 217 disposed therein for raising tone arm 36 vertically from its lower inoperative position of Fig. 11 to a normal, intermediate, neutral position. To accomplish this function, the upper end of sleeve 217 is adapted to engage the lower, concave surface of a lifting pad 218 depending from, and rigidly secured in any suitable manner to, the upper tone arm bracket 188. The lower end of sleeve 217 rests upon and is supported by the outer end of a leaf spring 219 secured at its inner end in any suitable manner to the outer end of a lifting lever 221. As shown in Figs. 8 and 13, the inner end of this lever 221 is pivotally supported at 222 on a bracket 223 mounted in any desired manner on the bottom plate 33 of supporting frame A. Intermediate its ends, lever 221 is provided with a depending finger or lug 224 formed integrally therewith, and having its lower edge engaging the upper surface of the annular cam track 73 formed on the cam gear 49. The major portion of this cam track 73 is disposed in the same horizontal plane, and a single dip is provided therein which causes following downward movement of finger 224 and lowering of leaf spring 219 and sleeve 217 to their position of Figs. 13 and 11 to permit tone arm 36 to be lowered by gravity from its neutral position into engagement with a record on turntable B. The inner end of the lower tone arm bracket 186 may be provided with an upstanding flange 225 (Figs. 10 and 11) for the purpose of engaging the inner end of the upper tone arm bracket 188 to limit such downward movement of the inner end of tone arm 36 to prevent the latter from dropping below the plane of the upper surface of turntable B. The dip in cam track 73 becomes effective to permit such lowering of the inner end of the tone arm during that part of rotation of cam 75 in which the dwell 75e thereof is effective. The following rising slope on the cam track 73 becomes effective to raise the rear end of lever 221 to lift the tone arm from engagement with a played record into its neutral position during that period of the cycle in which the initial portion 75a of cam 75 is effective.

Figure 14:
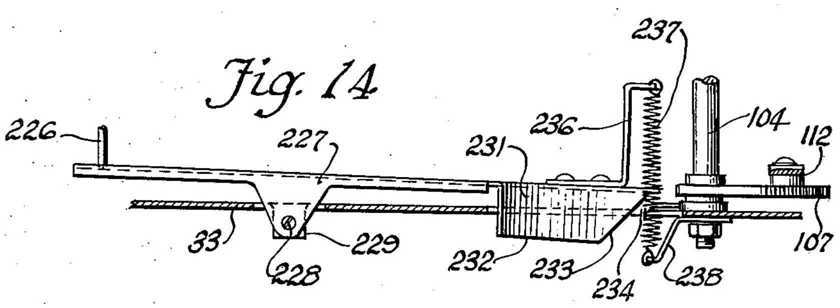
Fig. 14 is a detail elevational view showing the mechanism for raising the stylus end of the tone arm vertically from neutral position.

Separate means are provided for raising the inner end of the tone arm into playing engagement with a record in the intermediate playing position $R^2$, which is effective only during parts II and III of the previously described four-part automatic cycle of operations. This means comprises a pin 226 extending vertically through the floating sleeve 217 (Figs. 10 and 11), the upper end of which is adapted to engage the lower concave surface of tone arm lifting pad 218. The lower end of pin 226 passes freely through a suitable aperture in leaf spring 219 and rests upon, and is supported by, the rear end of a lifting lever 227 which is pivotally mounted intermediate its ends on a horizontally disposed pin 228 (Figs. 7 and 14) supported in trunnion ears struck downwardly from the lower plate 33 of supporting frame A. The forward end of this lifting lever 227 is provided with a depending flange 231 having its lower edge divided into a substantially horizontal cam portion 232, and a sharply rising cam portion 233 forming a continuation thereof. The cam edge 232 is normally engaged by one end of a bell crank 234 to maintain the forward end of lifting lever 227 raised and the rear end thereof lowered in its position of Fig. 11. This bell crank 234 is pivotally mounted intermediate its ends on the shaft 89 (Fig. 8) and the other end thereof is secured by a pin and slot connection 235 to the link 112 of the auxiliary record supporting means G. As shown in Fig. 14, an upstanding bracket 236 is mounted upon the forward end of lifting lever 227 and is connected to the upper end of a lifting spring 237, the lower end of which is connected to a bracket 238 mounted on the lower end of the adjacent vertical shaft 104.

The forward end of the lifting lever 227 is normally in a raised position with the cam edge 232 disposed in a horizontal plane and resting upon the free end of bell crank 234, the rear end of lifting lever 227 being in its lowermost position of Fig. 11. During inward and outward horizontal swinging of the auxiliary record supporting wheels 45 in portions I and IV of both the two-part and four-part cycles of operations of actuating mechanism H, as previously described, reciprocation of bell crank 234 by virtue of its pin and slot connection 235 with link 112 merely swings the free end of this bell crank back and forth under the cam edge 232 of lifting lever 227. Consequently, the lifting lever 227 remains inoperative during the first and last portions of any four-part cycle of operations and during any complete two-part cycle. During the latter part of portion II of any four-part cycle of operations of actuating mechanism H, however, as the final downward movement of record supporting wheels 45 takes place, bell crank 234 is further swung in a counter-clockwise direction (viewing Fig. 8) to carry the free end thereof into engagement with cam edge 233 of the lifting lever 227. Such additional swinging of bell crank 234 thus permits lifting spring 237 to contract to lower the forward end of lifting lever 227 and raise the rear end thereof to the position illustrated in Fig. 14. This lifting of the rear end of lever 227 by spring 237 raises rod 226 into engagement with lifting pad 218 to raise the forward end of tone arm 36 from its normal neutral position to engage needle 38 with the underside of a record supported by wheels 45 in position $R^2$, as shown in Fig. 10. Lifting spring 237 is so designed as to overcome the weight of rod 226 and the weight of tone arm 36 not balanced by spring 191 to provide the desired record-engaging pressure on stylus 38. It will be understood that if no records are disposed upon turntable B, wheels 45 will be lowered into engagement with the turntable, thus determining the lowest position $R^2$ in which any record will be supported for the playing of the recording on the under surface thereof. The sharply rising cam edge 233 on lifting lever 227 (Fig. 14) is so designed in relation to the farthest forward position to which the free end of bell crank 234 is swung (as shown in Fig. 8), however, that stylus 38 may be raised by spring 237 to properly engage the under surface of a record supported by wheels 45 in the uppermost position $R^2$, which is spaced above the lowermost position $R^2$ a distance equal to the total thickness of the maximum number of records that it is desired to have the turntable B carry. If stylus 38 engages a record in a lower position $R^2$, continued movement of bell crank 234 will merely withdraw the free end thereof from contacting engagement with cam edge 233 of the lifting lever. The leverages involved in the mounting of lifting lever 227 and tone arm 36 are such that spring 237 will impress a substantially constant lifting force thereon throughout its relatively short working range.

During the initial part of portion III of any four-part cycle of operations of the actuating mechanism H, bell crank 234 is returned by link 112 in a clockwise direction from its position of Fig. 8 to raise the forward end of lifting lever 227 and lower the rear end thereof from its position of Fig. 10 to that of Fig. 11 to disengage the stylus 38 from the under surface of the played record. Such action of bell crank 234 and associated parts takes place during the movement of dwell portion 75a past follower 214 and before cam 75 permits outward horizontal movement of the tone arm 36 by spring 206. At this same time, the following rise of cam track 73 becomes effective to raise lifting lever 221 and leaf spring 219 from their positions of Figs. 10 and 13 to lift the hollow sleeve 217 to its uppermost position. In the latter position, the upper end of sleeve 217 contacts lifting pad 218 to prevent lowering of the forward end of tone arm 36 below the normal neutral position thereof.

It will thus be seen that, while lifting lever 221 is activated during each two-part or four-part cycle of operations of the actuating mechanism H, lifting lever 227 is activated only during the latter part of portion II and the first part of portion III of each four-part cycle and is inoperative throughout each two-part cycle of operations. A tone arm having both an upper and a lower needle or stylus thus is provided with separate means for effecting record engagement of each stylus, whereby proper record-engaging stylus pressure may be maintained accurately under all possible playing conditions.

As will be appreciated from Figs. 2 and 13, the downward extension or finger 224 of lifting lever 221 is in constant engagement with the upper surface of cam track 73 on cam gear 46. As shown in Figs. 2 and 12, the outer end of trip lever 53 is normally disposed in an inward position relative to cam track 73. In its broken line position of Fig. 5, however, which is its unlatched or active position, this outer end of trip lever 53 extends outwardly beyond cam track 73. Consequently, as cam gear 46 rotates following a tripping of lever 53, the outer end of the latter is carried past finger 224 of lifting lever 221 and is moved thereby inwardly to effect a relatching of trip lever 53 by latch lever 56. The brake and positioning finger 69, previously described generally, is pivotally mounted intermediate its ends at 239 (Fig. 8) on a horizontally disposed bracket 241 rigidly mounted on the front shaft 104 in any suitable manner. The front arm of finger 69 is interconnected with an outer arm of the bracket 241 by a spring 242 which maintains the rearwardly extending end of finger 69 in yieldable engagement with the notch in peripheral cam 68. A pin 243 is mounted on bracket 241 for engagement with the forward arm of finger 69 to limit clockwise swinging of the finger (as viewed in Fig. 8) by spring 242. If desired, a suitable normally closed switch may be mounted on bracket 241, and electrically connected in series with the tone arm pick-up 37 (Fig. 10), so as to be opened mechanically by clockwise swinging of brake finger 69 from its normal position of Fig. 8 to break the circuit from pick-up 37. With such arrangement, cam 68 would be continued around the entire periphery of cam gear 46, so that the tone arm 36 would be muted automatically throughout each cycle of operations of the actuating mechanism H.

*Control mechanism*

The specific construction and operation of control lever 54, reject lever 55, trip lever 53, and their associate parts, have been described previously in relation to their control and initiation of the operation of the instant mechanism, as well as the general functions of control switches 59, 62, 63 and 64 and solenoid 61. Consequently, the specific mounting and arrangement of these latter control members and their electrical interconnections now will be described, in conjunction with which particular reference is made to Figs. 20 to 24. The main starting switch 59 is mounted, as shown in Figs. 20 and 21, on a plate 244 secured at its upper end in any suitable manner to, and depending from, the top plate 32 of supporting frame A, and is provided with a spring lever 245 adapted to be moved to the left (viewing Fig. 20) to close the switch. Pivotally mounted at its lower end at 246, is a switch actuating lever 247 which extends upwardly through a suitable aperture in the top plate 32 and is provided at its upper end with an operating knob 248. As shown in Fig. 1, this main switch operating knob 248 for convenience is disposed directly adjacent similar operating knobs provided on the control lever 54 and the reject lever 55. Referring back to Figs. 20 and 21, the switch actuating lever 247 is provided adjacent its upper end with a movement-guiding pin and slot connection 249 to the mounting plate 244 and a forwardly extending finger 251 for engagement with the upper end of spring lever 245. Intermediate the pin and slot connections 249 and the pivot 246, the switch actuating lever 247 is provided with a rearwardly extending latching pin 252 which passes through a suitable aperture in the mounting plate 244 for engagement with one or the other of a pair of notches 253 provided in the lower edge of a latch lever 254. This latch lever 254 is pivotally mounted at 255 at its rear end on the mounting plate 244 and is connected at its forward end to the upper end of a coil spring 256, the lower end of which is attached to the mounting plate 244. With this arrangement, switch actuating lever 247 is resiliently maintained either in its full line, operative position or its broken line, inoperative position of Fig. 20. Intermediate the latching pin 252 and the pivot 246, the switch actuating lever 247 is pivotally connected to the outer end of a yoke 257 which is attached in any suitable manner at its inner end to the armature of solenoid 61. The solenoid 61 is supported by a bracket 258 secured in any desired manner to the top plate 32.

Switch actuating lever 247 is adapted to be moved manually to its full line position of Fig.

20 to close the main control switch 59, and it will be held in this operative position by engagement of the outermost notch 253 with latching pin 252. Upon energization of solenoid 61, its armature will be moved inwardly to draw the connecting yoke 257 with it to move switch actuating lever 247 to its broken line inoperative position of Fig. 20 against the restraining action of spring 256. The actuating lever will be maintained in such inoperative position by engagement of the inner notch 253 with the latching pin 252, and main switch 59 is open in this position of lever 247.

As shown in Fig. 24, one side of the main switch 59 is electrically connected to the positive side 259 of a suitable source of electrical energy, and the other side of this switch is connected by a lead 261 to one side of the driving motor C. The other side of the motor C is connected by a lead 262 to the negative side of the source of electrical energy. Consequently, whenever switch actuating lever 247 is moved from its full line position to its broken line position of Fig. 24, the motor C is energized, and whenever main switch 59 is opened, either by manual movement of switch actuating lever 247, or by automatic movement thereof in response to energization of solenoid 61 to its full line position of Fig. 24, the motor C will be deenergized.

As shown in Fig. 22, both of the control switches 62 and 63 are supported by a bracket 263 depending from, and secured in any suitable manner to, the top plate 32 of supporting frame A. Control switch 64 is supported by a bracket 264, as shown in Fig. 23, which likewise is attached to the top plate 32 in any suitable manner. As illustrated in Fig. 24, control switch 63 is connected at one side by a lead 265 to the lead 261, and at its other side to control switch 62 by a lead 266. Control switch 62 is connected to one side of control switch 64 by a lead 267, and the other side of switch 64 is connected by a lead 268 to one side of the solenoid 61, the other side of the latter being connected to the negative line 262 by a lead 269. Thus, it will be seen that main switch 59 and motor C are connected in series with each other, and that all four control switches 59, 63, 62 and 64 also are connected in series with each other and with solenoid 61.

As has been described hereinbefore, control switch 62 is normally closed and is adapted to be opened automatically by control rod 44 depressing spring lever 164 whenever any record or records are mounted on the record supporting means E. Control switches 63 and 64 normally are open, the former being closed by finger 181 of actuating lever 66 contacting spring lever 182 only when the auxiliary record supporting wheels 45 are in their outermost inoperative position, as shown in broken lines in Fig. 1. Switch 64 is closed by engagement of the rear end of lever 192 with the lower end of switch arm 216 whenever the tone arm is moved to its play-terminating, innermost position 36*d* of Fig. 1. Consequently, solenoid 61 will be energized to open main switch 59 to deenergize motor C only when there are no records on supporting means E, the auxiliary record supporting wheels 45 are in their outermost inoperative position, and the tone arm 36 is in its play-terminating position. It wil be noted that with this arrangement, the main switch 59 will be opened automatically to terminate operation of the machine after completion of the playing of any recording when control lever 54 previously has been set to its manual position, as well as when the recording on the upper surface of the last record has been played during automatic operation of the phonograph with control lever 54 previously set in either of its other two positions. Upon such automatic termination of the operation of the phonograph, the tone arm 36 will remain in its play-terminating position 36*d* of Fig. 1, but it may be freely swung manually therefrom to its inoperative position 36*a*, as previously explained, to permit removal of the played records from the turntable B. Also, if less than the machine's capacity number of records have been played, additional records may be played without manually removing the tone arm to its inoperative position 36*a* merely by placing additional records on the supporting means E, selectively setting control lever 54 to either of its two automatic positions and closing main switch 59 by means of its operating knob 248, since the auxiliary record suporting wheels 45 will be swung to their inner, operative position to protect the tone arm before the push-off or record-delivery means F is actuated, as explained in detail hereinbefore. Consequently, normal operation of the phonograph, either for playing a single recording, or for automatically playing either the recordings on both sides of a plurality of records or only those on the obverse sides thereof, requires only the pre-setting of control lever 54 and the manual closing of main switch 59. However, operation of reject lever 55 during the playing of any recording will require the manual opening of main switch 59 to terminate machine operation, if this recording, the playing of which was thus interrupted, comprises that which normally would have been the last to be played. Of course, if the machine is operating automatically and playing a recording which normally would not be the last to be played, and the reject lever 55 is actuated, the actuating mechanism H will operate automatically to institute playing of the next recording normally following that rejected.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a phonograph having record reproducer means, a turntable, storage means for supporting a plurality of disc records, and means for moving said records one at a time from said storage means into a position in alignment with said turntable; record support means for receiving each record so positioned by said moving means and delivering the same to said turntable, comprising a plurality of swingable members, means for swinging said members simultaneously from an inoperative normal position to a receiving position in alignment with said turntable and back to said normal position, and resilient connections between said swinging means and said members for preventing injury to said support means resulting from manual movement of said swingable members, said swinging means including a driving cam member operatively associated with each of said swingable members, and said resilient connections comprising a driven cam member connected to each of said swingable members, and a spring resiliently maintaining each of said driven cam members in engagement with its associated driving cam member.

2. A phonograph, comprising record reproducer means, a turntable storage means for supporting a plurality of disc records, including a normally inoperative control member movable to operative position by the weight of a record or records mounted thereon, and automatically movable to inoperative position upon removal of all records therefrom, means for moving said records one at a time from said storage means into alignment with said turntable, normally inoperative record receiving means operable to receive and support each record, so positioned by said moving means, in position for the playing of the recording on the under side thereof by said reproducer means and to deliver the record, after such playing, to said turntable for the playing of the recording on the upper side thereof by said reproducer means, actuating mechanism for cyclically operating said record reproducer means, said moving means and said receiving means, and a control circuit, comprising a suitable source of electrical energy, a motor for driving said turntable and said actuating mechanism, a normally open main switch adapted to be closed manually and connected in series with said source and said motor, a normally closed control switch opened in response to movement of said control member to operative position and closed automatically whenever no records are mounted on said storage means, a normally open operation-terminating switch adapted to be closed by said reproducer means upon termination of the playing of a record, a normally open switch adapted to be closed upon movement of said receiving means to inoperative position, and switch opening means connected in series with said source and said switches and actuated in response to closing of all of said switches to open said main switch.

JOHN R. CAMBRON.
DAVID C. ROCKOLA.

REFERENCES CITED

The following references are of record in the file of this patent:

UNITED STATES PATENTS

| Number | Name | Date |
|---|---|---|
| 1,391,455 | Brommer | Sept. 20, 1921 |
| 1,879,291 | Johnson et al. | Sept. 27, 1932 |
| 1,966,576 | Allen | July 17, 1934 |
| 2,090,746 | Compare | Aug. 24, 1937 |
| 2,290,518 | Wright | July 21, 1942 |
| 2,295,092 | Offen | Sept. 8, 1942 |
| 2,307,030 | Erwood | Jan. 5, 1943 |
| 2,313,262 | Pressley | Mar. 9, 1943 |
| 2,318,654 | Wissner | May 11, 1943 |
| 2,352,331 | Leline | June 27, 1944 |
| 2,371,362 | Small | Mar. 13, 1945 |
| 2,506,926 | Johnson | May 9, 1950 |

FOREIGN PATENTS

| Number | Country | Date |
|---|---|---|
| 419,299 | Great Britain | Nov. 5, 1934 |
| 822,026 | France | Dec. 18, 1937 |
| 541,156 | Great Britain | Nov. 14, 1941 |
| 111,950 | Sweden | Sept. 26, 1944 |